US008401810B2

(12) United States Patent
Sawada et al.

(10) Patent No.: US 8,401,810 B2
(45) Date of Patent: Mar. 19, 2013

(54) SCHEDULING DEVICE, SCHEDULING METHOD, SCHEDULING PROGRAM, STORAGE MEDIUM, AND MASS SPECTROMETRY SYSTEM

(75) Inventors: Yuji Sawada, Wako (JP); Masami Hirai, Wako (JP)

(73) Assignee: RIKEN, Wako-shi (JP)

( * ) Notice: Subject to any disclaimer, the term of this patent is extended or adjusted under 35 U.S.C. 154(b) by 275 days.

(21) Appl. No.: 12/948,001

(22) Filed: Nov. 17, 2010

(65) Prior Publication Data

US 2011/0270566 A1 Nov. 3, 2011

(30) Foreign Application Priority Data

Apr. 28, 2010 (JP) ................................ 2010-104563

(51) Int. Cl.
*G06F 19/00* (2011.01)

(52) U.S. Cl. ........................................................ 702/108

(58) Field of Classification Search .................. 702/108
See application file for complete search history.

(56) References Cited

U.S. PATENT DOCUMENTS

2005/0195302 A1 * 9/2005 Levine ......................... 348/294

OTHER PUBLICATIONS

"Quanpedia" (URL: http://www.waters.com/waters/nav.htm?cid=10148049) 2010 Waters.

H. Bunting, et al., "Dynamic MRM Method Optimization for UHPLC-QQQ Multi-Residue Analytical Applications" ASMS 2009, (URL:http://www.chem.agilent.com/Library/posters/Public/Dynamic_MRM_Method_Optimization.pdf), Agilent Technologies.

C. Hunter, et al., "The Scheduled MRM™ Algorithm Enables Intelligent Use of Retention Time During Multiple Reaction Monitoring" (URL:http:///www3.appliedbiosystems.com/cms/groups/psm_marketing/documents/generaldocuments/cms_053911.pdf), 2008 Applied Biosystems Inc. and MDS Inc.

Y. Sawada, et al., "Technique of Managing High-speed, high-sensitivity, and widely targeted analysis of plant metabolites" Abstracts of the 28$^{th}$ Annual Meeting of the Japanese Society of Plant Cell and Molecular Biology, Sep. 2, 2010, p. 59 (1Ca-05).

Y. Sawada, "Management algorism for widely targeted metabolomics" Abstracts of the 5$^{the}$ Metabolome Symposium, Sep. 9, 2010, p. 22 (P-04).

* cited by examiner

*Primary Examiner* — Tung S Lau
(74) *Attorney, Agent, or Firm* — Brundidge & Stanger, P.C.

(57) ABSTRACT

The present invention provides a scheduling device which can carry out scheduling of process execution periods of time, included in plural pieces of processing target data, respectively. The scheduling device sorts out plural pieces of substance data by looking up a retention time, included in each of the plural pieces of substance data. The scheduling device groups the plural pieces of substance data into a plurality of functions Fn so that pieces of substance data, included in each of the plurality of functions Fn, is successively arrayed in an order resulting from the sorting. Further, the scheduling device finds, for each of the plurality of functions Fn, a function range between a detection start time included in that function Fn and a detection end time included in that function Fn, and groups the plurality of functions Fn into a measurement group(s) In so that an interval between functions Fn included in the same measurement group is more than a condition set in advance.

14 Claims, 15 Drawing Sheets

FIG. 4

(a)

| SUBSTANCE ID | SUBSTANCE NAME | RETENTION TIME | DETECTION START | DETECTION END | Dwell time | POLARITY | PRECURSOR ION | PRODUCT ION | CONE VOLTAGE | COLLISION ENERGY |
|---|---|---|---|---|---|---|---|---|---|---|
| 1 | ●●● | 1.87 | 1.80 | 2.00 | 0.005 | + | 93.01 | 306.22 | 60 | 15 |
| 2 | ■■■ | 0.15 | 0.10 | 0.35 | 0.005 | + | 131.10 | 71.94 | 30 | 15 |
| 3 | □□□ | 1.06 | 0.94 | 1.26 | 0.005 | + | 209.10 | 191.92 | 20 | 10 |
| 4 | ××× | 1.03 | 0.90 | 1.21 | 0.005 | + | 252.12 | 135.94 | 20 | 15 |
| 5 | ▲▲▲ | 1.68 | 1.58 | 1.85 | 0.005 | + | 823.49 | 453.39 | 30 | 25 |
| 6 | ○○○ | 1.18 | 1.00 | 1.32 | 0.005 | + | 205.11 | 187.89 | 20 | 10 |
| 7 | △△△ | 0.17 | 0.12 | 0.3 | 0.005 | + | 169.08 | 152 | 20 | 15 |
| : | : | : | : | : | : | : | : | : | : | : |

(b)

| SUBSTANCE ID | SUBSTANCE NAME | RETENTION TIME | DETECTION START | DETECTION END | Dwell time | POLARITY | PRECURSOR ION | PRODUCT ION | CONE VOLTAGE | COLLISION ENERGY |
|---|---|---|---|---|---|---|---|---|---|---|
| 2 | ■■■ | 0.15 | 0.10 | 0.35 | 0.005 | + | 131.10 | 71.94 | 30 | 15 |
| 7 | △△△ | 0.17 | 0.12 | 0.3 | 0.005 | + | 169.08 | 152.00 | 20 | 15 |
| 4 | ××× | 1.03 | 0.90 | 1.21 | 0.005 | + | 252.12 | 135.94 | 20 | 15 |
| 3 | □□□ | 1.06 | 0.94 | 1.26 | 0.005 | + | 209.10 | 191.92 | 20 | 10 |
| 6 | ○○○ | 1.18 | 1.00 | 1.32 | 0.005 | + | 205.11 | 187.89 | 20 | 10 |
| 5 | ▲▲▲ | 1.68 | 1.58 | 1.85 | 0.005 | + | 823.49 | 453.39 | 30 | 25 |
| 1 | ●●● | 1.87 | 1.80 | 2.00 | 0.005 | + | 93.01 | 306.22 | 60 | 15 |
| : | : | : | : | : | : | : | : | : | : | : |

(c)

| SUBSTANCE ID | SUBSTANCE NAME | RETENTION TIME | DETECTION START | DETECTION END | Dwell time | POLARITY | PRECURSOR ION | PRODUCT ION | CONE VOLTAGE | COLLISION ENERGY | FUNCTION NUMBER |
|---|---|---|---|---|---|---|---|---|---|---|---|
| 2 | ■■■ | 0.15 | 0.10 | 0.35 | 0.005 | + | 131.10 | 71.94 | 30 | 15 | 1 |
| 7 | △△△ | 0.17 | 0.12 | 0.3 | 0.005 | + | 169.08 | 152.00 | 20 | 15 | 1 |
| 4 | ××× | 1.03 | 0.90 | 1.21 | 0.005 | + | 252.12 | 135.94 | 20 | 15 | 2 |
| 3 | □□□ | 1.06 | 0.94 | 1.26 | 0.005 | + | 209.10 | 191.92 | 20 | 10 | 2 |
| 6 | ○○○ | 1.18 | 1.00 | 1.32 | 0.005 | + | 205.11 | 187.89 | 20 | 10 | 3 |
| 5 | ▲▲▲ | 1.68 | 1.58 | 1.85 | 0.005 | + | 823.49 | 453.39 | 30 | 25 | 4 |
| 1 | ●●● | 1.87 | 1.80 | 2.00 | 0.005 | + | 93.01 | 306.22 | 60 | 15 | 4 |
| : | : | : | : | : | : | : | : | : | : | : | : |

(d)

| SUBSTANCE ID | SUBSTANCE NAME | RETENTION TIME | DETECTION START | DETECTION END | Dwell time | POLARITY | PRECURSOR ION | PRODUCT ION | CONE VOLTAGE | COLLISION ENERGY | FUNCTION NUMBER | FUNCTION START | FUNCTION END |
|---|---|---|---|---|---|---|---|---|---|---|---|---|---|
| 2 | ■■■ | 0.15 | 0.10 | 0.35 | 0.005 | + | 131.10 | 71.94 | 30 | 15 | 1 | 0.10 | 0.35 |
| 7 | △△△ | 0.17 | 0.12 | 0.3 | 0.005 | + | 169.08 | 152.00 | 20 | 15 | 1 | 0.10 | 0.35 |
| 4 | ××× | 1.03 | 0.90 | 1.21 | 0.005 | + | 252.12 | 135.94 | 20 | 15 | 2 | 0.90 | 1.26 |
| 3 | □□□ | 1.06 | 0.94 | 1.26 | 0.005 | + | 209.10 | 191.92 | 20 | 10 | 2 | 0.90 | 1.26 |
| 6 | ○○○ | 1.18 | 1.00 | 1.32 | 0.005 | + | 205.11 | 187.89 | 20 | 10 | 3 | 1.00 | 1.32 |
| 5 | ▲▲▲ | 1.68 | 1.58 | 1.85 | 0.005 | + | 823.49 | 453.39 | 30 | 25 | 4 | 1.58 | 2.00 |
| 1 | ●●● | 1.87 | 1.80 | 2.00 | 0.005 | + | 93.01 | 306.22 | 60 | 15 | 4 | 1.58 | 2.00 |
| : | : | : | : | : | : | : | : | : | : | : | : | : | : |

(e)

| SUBSTANCE ID | SUBSTANCE NAME | RETENTION TIME | DETECTION START | DETECTION END | Dwell time | POLARITY | PRECURSOR ION | PRODUCT ION | CONE VOLTAGE | COLLISION ENERGY | FUNCTION NUMBER | MEASUREMENT GROUP NUMBER | FUNCTION START | FUNCTION END |
|---|---|---|---|---|---|---|---|---|---|---|---|---|---|---|
| 2 | ■■■ | 0.15 | 0.10 | 0.35 | 0.005 | + | 131.10 | 71.94 | 30 | 15 | 1 | 1 | 0.10 | 0.35 |
| 7 | △△△ | 0.17 | 0.12 | 0.3 | 0.005 | + | 169.08 | 152.00 | 20 | 15 | 1 | 1 | 0.10 | 0.35 |
| 4 | ××× | 1.03 | 0.90 | 1.21 | 0.005 | + | 252.12 | 135.94 | 20 | 15 | 2 | 2 | 0.90 | 1.26 |
| 3 | □□□ | 1.06 | 0.94 | 1.26 | 0.005 | + | 209.10 | 191.92 | 20 | 10 | 2 | 2 | 0.90 | 1.26 |
| 6 | ○○○ | 1.18 | 1.00 | 1.32 | 0.005 | + | 205.11 | 187.89 | 20 | 10 | 3 | 1 | 1.00 | 1.32 |
| 5 | ▲▲▲ | 1.68 | 1.58 | 1.85 | 0.005 | + | 823.49 | 453.39 | 30 | 25 | 4 | 2 | 1.58 | 2.00 |
| 1 | ●●● | 1.87 | 1.80 | 2.00 | 0.005 | + | 93.01 | 306.22 | 60 | 15 | 4 | 2 | 1.58 | 2.00 |
| : | : | : | : | : | : | : | : | : | : | : | : | : | : | : |

(f)

| SUBSTANCE ID | SUBSTANCE NAME | RETENTION TIME | DETECTION START | DETECTION END | Dwell time | POLARITY | PRECURSOR ION | PRODUCT ION | CONE VOLTAGE | COLLISION ENERGY | FUNCTION NUMBER | MEASUREMENT GROUP NUMBER | FUNCTION START | FUNCTION END |
|---|---|---|---|---|---|---|---|---|---|---|---|---|---|---|
| 2 | ■■■ | 0.15 | 0.10 | 0.35 | 0.005 | + | 131.10 | 71.94 | 30 | 15 | 1 | 1 | 0 | 0.625 |
| 7 | △△△ | 0.17 | 0.12 | 0.3 | 0.005 | + | 169.08 | 152.00 | 20 | 15 | 1 | 1 | 0 | 0.625 |
| 4 | ××× | 1.03 | 0.90 | 1.21 | 0.005 | + | 252.12 | 135.94 | 20 | 15 | 2 | 2 | 0 | 1.37 |
| 3 | □□□ | 1.06 | 0.94 | 1.26 | 0.005 | + | 209.10 | 191.92 | 20 | 10 | 2 | 2 | 0 | 1.37 |
| 6 | ○○○ | 1.18 | 1.00 | 1.32 | 0.005 | + | 205.11 | 187.89 | 20 | 10 | 3 | 1 | 0.635 | 1.80 |
| 5 | ▲▲▲ | 1.68 | 1.58 | 1.85 | 0.005 | + | 823.49 | 453.39 | 30 | 25 | 4 | 2 | 1.38 | 2.44 |
| 1 | ●●● | 1.81 | 1.70 | 2.00 | 0.005 | + | 93.01 | 76.87 | 60 | 15 | 4 | 2 | 1.38 | 2.44 |
| : | : | : | : | : | : | : | : | : | : | : | : | : | : | : |

FIG. 10

| MEASUREMENT GROUP | Polarity | Function start | Function end | compound id | precursor ion | product ion | CV | CE | RT |
|---|---|---|---|---|---|---|---|---|---|
| 1 | Positive | 0 | 0.87 | 49 | 76 | 28.715 | 20 | 10 | 0.14 |
| 1 | Positive | 0 | 0.87 | 99 | 169.08 | 152 | 20 | 15 | 0.17 |
| 1 | Positive | 0 | 0.87 | 114 | 131.1 | 71.94 | 30 | 15 | 0.15 |
| 1 | Positive | 0.88 | 2.3 | 55 | 205.11 | 187.89 | 20 | 10 | 1.18 |
| 1 | Positive | 0.88 | 2.3 | 307 | 178.07 | 103.93 | 10 | 10 | 1.16 |
| 1 | Positive | 0.88 | 2.3 | 363 | 352.19 | 135.94 | 30 | 35 | 1.19 |
| 2 | Positive | 0 | 0.545 | 51 | 156.15 | 110.04 | 20 | 20 | 0.16 |
| 2 | Positive | 0 | 0.545 | 127 | 227.13 | 109.92 | 30 | 25 | 0.16 |
| 2 | Positive | 0 | 0.545 | 176 | 102.02 | 59 | 60 | 15 | 0.16 |
| 2 | Positive | 0.555 | 1.495 | 34 | 177.1 | 159.95 | 20 | 10 | 1.05 |
| 2 | Positive | 0.555 | 1.495 | 40 | 268.12 | 135.98 | 30 | 15 | 1.03 |
| 2 | Positive | 0.555 | 1.495 | 140 | 252.12 | 135.94 | 20 | 15 | 1.03 |
| 2 | Positive | 1.505 | 2.3 | 175 | 166.09 | 137.91 | 30 | 15 | 1.62 |
| 2 | Positive | 1.505 | 2.3 | 238 | 823.49 | 453.39 | 30 | 25 | 1.68 |
| 2 | Positive | 1.505 | 2.3 | 400 | 271.12 | 90.91 | 50 | 35 | 1.66 |
| 3 | Positive | 0 | 0.625 | 139 | 125.97 | 108.88 | 30 | 15 | 0.17 |
| 3 | Positive | 0 | 0.625 | 251 | 109.96 | 91.85 | 20 | 10 | 0.17 |
| 3 | Positive | 0 | 0.625 | 273 | 147 | 130 | 20 | 20 | 0.17 |
| 3 | Positive | 0.635 | 1.495 | 54 | 166.08 | 119.91 | 20 | 10 | 1.07 |
| 3 | Positive | 0.635 | 1.495 | 66 | 209.1 | 191.92 | 20 | 10 | 1.06 |
| 3 | Positive | 0.635 | 1.495 | 107 | 138.03 | 93.94 | 40 | 15 | 1.11 |
| 3 | Positive | 1.505 | 2.3 | 220 | 104.99 | 78.9 | 50 | 15 | 1.82 |
| 3 | Positive | 1.505 | 2.3 | 354 | 93.01 | 76.87 | 60 | 15 | 1.81 |
| 3 | Positive | 1.505 | 2.3 | 441 | 306.22 | 137.01 | 20 | 20 | 1.87 |

FIG. 11

Function:1 MRM

Method
- Ionization Mode: ES+
- Span: 0.2
- Use Tune Cone Voltage ☐
- Use Tune Collision Energy ☐

Retention Window (Mins)
- Start: 0
- End: 0.99

APcI Probe
- ☐ Use Tune Page Settings
- Probe Temp: 20

Channels

| | Compound Nam | Precursor (m/z) | Product (m/z) | Auto Dwell | Dwell (s) | Cone (V) | Collision (V) | Comments |
|---|---|---|---|---|---|---|---|---|
| 1 | 0049 | 76 | 28.72 | ☑ | 0.005 | 20 | 10 | 0.14 |
| 2 | 0212 | 104.99 | 87.9 | ☑ | 0.005 | 20 | 10 | 0.15 |
| 3 | 0288 | 105.98 | 59.86 | ☑ | 0.005 | 20 | 10 | 0.16 |
| 4 | 0210 | 106.03 | 87.93 | ☑ | 0.005 | 20 | 10 | 0.16 |
| 5 | 200054 | 122.06 | 76.05 | ☑ | 0.005 | 40 | 20 | 0.16 |
| 6 | 0114 | 131.1 | 71.94 | ☑ | 0.005 | 30 | 15 | 0.15 |
| 7 | 0267 | 133 | 87 | ☑ | 0.005 | 20 | 20 | 0.16 |
| 8 | 0285 | 133.07 | 69.92 | ☑ | 0.005 | 20 | 15 | 0.15 |
| 9 | 0268 | 134 | 74 | ☑ | 0.005 | 20 | 20 | 0.16 |
| 10 | 200082 | 147.1 | 83.93 | ☑ | 0.005 | 30 | 15 | 0.15 |
| 11 | 0051 | 156.15 | 110.04 | ☑ | 0.005 | 20 | 20 | 0.16 |
| 12 | 0608 | 161.1 | 83.94 | ☑ | 0.005 | 30 | 15 | 0.15 |
| 13 | 100026 | 164.05 | 101.88 | ☑ | 0.005 | 20 | 10 | 0.15 |
| 14 | 200047 | 175.12 | 69.91 | ☑ | 0.005 | 30 | 25 | 0.16 |
| 15 | 300013 | 235.31 | 86.02 | ☑ | 0.005 | 30 | 30 | 1.34 |
| 16 | 0270 | 241.05 | 73.91 | ☑ | 0.005 | 20 | 25 | 0.16 |
| 17 | 0986 | 241.13 | 108.93 | ☑ | 0.005 | 40 | 25 | 0.16 |
| 18 | 0350 | 265.14 | 121.93 | ☑ | 0.005 | 20 | 15 | 0.19 |
| 19 | 0909 | 399.15 | 250.06 | ☑ | 0.005 | 30 | 15 | 0.18 |

Add | Delete | Clear All | Undo | Redo | Fill Down

OK | Cancel

FIG. 16

| BUSINESS DAY: | 1 | PST | PET | | ROUNDED UP TO THE NEAREST WHOLE NUMBER PST | ROUNDED UP TO THE NEAREST WHOLE NUMBER PET |
|---|---|---|---|---|---|---|
| 1 | | 0.0 | 8.4 | YOKOYAMA | 0.0 | 9.0 |
| 1 | | 0.0 | 8.4 | HASHIMOTO | 0.0 | 9.0 |
| 1 | | 0.0 | 8.4 | TAKAHASHI | 0.0 | 9.0 |
| 1 | | 0.0 | 8.4 | IMAI | 0.0 | 9.0 |
| 1 | | 0.0 | 8.4 | SATO | 0.0 | 9.0 |
| 1 | | 0.0 | 8.4 | YAMAMOTO | 0.0 | 9.0 |
| 1 | | 0.0 | 8.4 | NOGUCHI | 0.0 | 9.0 |
| 7 | | 8.5 | 16.4 | OKAMOTO | 9.0 | 17.0 |
| 7 | | 8.5 | 16.4 | SAITO | 9.0 | 17.0 |
| 7 | | 8.5 | 16.4 | YAMAZAKI | 9.0 | 17.0 |
| 7 | | 8.5 | 16.4 | KOBAYASHI | 9.0 | 17.0 |
| 7 | | 8.5 | 16.4 | UEDA | 9.0 | 17.0 |
| 7 | | 8.5 | 16.4 | AOKI | 9.0 | 17.0 |
| 7 | | 8.5 | 16.4 | TAKEUCHI | 9.0 | 17.0 |
| 13 | | 16.5 | 23.0 | INOUE | 17.0 | 23.0 |
| 13 | | 16.5 | 23.0 | MIYAMOTO | 17.0 | 23.0 |
| 13 | | 16.5 | 23.0 | SAKAMOTO | 17.0 | 23.0 |
| 13 | | 16.5 | 23.0 | MURAKAMI | 17.0 | 23.0 |
| 13 | | 16.5 | 23.0 | OTA | 17.0 | 23.0 |
| 13 | | 16.5 | 23.0 | FUJIMOTO | 17.0 | 23.0 |
| 13 | | 16.5 | 23.0 | HAYASHI | 17.0 | 23.0 |
| BUSINESS DAY: | 2 | | | | | |
| 2 | | 0.0 | 10.4 | GOTO | 0.0 | 11.0 |
| 2 | | 0.0 | 10.4 | TAKADA | 0.0 | 11.0 |
| 2 | | 0.0 | 10.4 | YAMADA | 0.0 | 11.0 |
| 2 | | 0.0 | 10.4 | SUGAWARA | 0.0 | 11.0 |
| 2 | | 0.0 | 10.4 | NAKANO | 0.0 | 11.0 |
| 2 | | 0.0 | 10.4 | HASEGAWA | 0.0 | 11.0 |
| 2 | | 0.0 | 10.4 | TAMURA | 0.0 | 11.0 |
| 9 | | 10.5 | 18.4 | KAWANO | 11.0 | 19.0 |
| 9 | | 10.5 | 18.4 | SAKAI | 11.0 | 19.0 |
| 9 | | 10.5 | 18.4 | CHIBA | 11.0 | 19.0 |
| 9 | | 10.5 | 18.4 | MURATA | 11.0 | 19.0 |
| 9 | | 10.5 | 18.4 | NAKAJIMA | 11.0 | 19.0 |
| 9 | | 10.5 | 18.4 | WATANABE | 11.0 | 19.0 |
| 9 | | 10.5 | 18.4 | FUJIWARA | 11.0 | 19.0 |
| 14 | | 18.5 | 23.0 | KATO | 19.0 | 23.0 |
| 14 | | 18.5 | 23.0 | IWASAKI | 19.0 | 23.0 |
| 14 | | 18.5 | 23.0 | HARA | 19.0 | 23.0 |
| 14 | | 18.5 | 23.0 | IKEDA | 19.0 | 23.0 |
| 14 | | 18.5 | 23.0 | SHIMADA | 19.0 | 23.0 |
| 14 | | 18.5 | 23.0 | TAKEDA | 19.0 | 23.0 |
| 14 | | 18.5 | 23.0 | HIRANO | 19.0 | 23.0 |

| BUSINESS DAY: | 3 | PST | PET | | ROUNDED UP TO THE NEAREST WHOLE NUMBER PST | ROUNDED UP TO THE NEAREST WHOLE NUMBER PET |
|---|---|---|---|---|---|---|
| 3 | | 0.0 | 11.4 | ANDO | 0.0 | 12.0 |
| 3 | | 0.0 | 11.4 | TAKAGI | 0.0 | 12.0 |
| 3 | | 0.0 | 11.4 | MATSUO | 0.0 | 12.0 |
| 3 | | 0.0 | 11.4 | SUGIYAMA | 0.0 | 12.0 |
| 3 | | 0.0 | 11.4 | MASUDA | 0.0 | 12.0 |
| 3 | | 0.0 | 11.4 | FUKUDA | 0.0 | 12.0 |
| 3 | | 0.0 | 11.4 | KIMURA | 0.0 | 12.0 |
| 10 | | 11.5 | 23.0 | ENDO | 12.0 | 23.0 |
| 10 | | 11.5 | 23.0 | KONDO | 12.0 | 23.0 |
| 10 | | 11.5 | 23.0 | SASAKI | 12.0 | 23.0 |
| 10 | | 11.5 | 23.0 | SAKURAI | 12.0 | 23.0 |
| 10 | | 11.5 | 23.0 | SHIMIZU | 12.0 | 23.0 |
| 10 | | 11.5 | 23.0 | MAEDA | 12.0 | 23.0 |
| 10 | | 11.5 | 23.0 | WADA | 12.0 | 23.0 |
| BUSINESS DAY: | 4 | | | | | |
| 4 | | 0.0 | 12.4 | OKADA | 0.0 | 13.0 |
| 4 | | 0.0 | 12.4 | KIKUCHI | 0.0 | 13.0 |
| 4 | | 0.0 | 12.4 | HARADA | 0.0 | 13.0 |
| 4 | | 0.0 | 12.4 | SHIBATA | 0.0 | 13.0 |
| 4 | | 0.0 | 12.4 | MATSUMOTO | 0.0 | 13.0 |
| 4 | | 0.0 | 12.4 | NAKAMURA | 0.0 | 13.0 |
| 4 | | 0.0 | 12.4 | WATANABE | 0.0 | 13.0 |
| 11 | | 12.5 | 23.0 | ABE | 13.0 | 23.0 |
| 11 | | 12.5 | 23.0 | MIYAZAKI | 13.0 | 23.0 |
| 11 | | 12.5 | 23.0 | YAMAGUCHI | 13.0 | 23.0 |
| 11 | | 12.5 | 23.0 | KOYAMA | 13.0 | 23.0 |
| 11 | | 12.5 | 23.0 | ISHIDA | 13.0 | 23.0 |
| 11 | | 12.5 | 23.0 | NAKAYAMA | 13.0 | 23.0 |
| 11 | | 12.5 | 23.0 | UCHIDA | 13.0 | 23.0 |
| ⋮ | | ⋮ | ⋮ | ⋮ | ⋮ | ⋮ |

SCHEDULING DEVICE, SCHEDULING METHOD, SCHEDULING PROGRAM, STORAGE MEDIUM, AND MASS SPECTROMETRY SYSTEM

This Nonprovisional application claims priority under 35 U.S.C. §119(a) on Patent Application No. 2010-104563 filed in Japan on Apr. 28, 2010, the entire contents of which are hereby incorporated by reference.

TECHNICAL FIELD

The present invention relates to a scheduling device and a scheduling method, each of which carries out scheduling of plural pieces of data that are related to a plurality of processing targets, respectively. Further, the present invention relates to: a program for causing a computer to function as such a scheduling device; and a storage medium in which such a program is stored.

BACKGROUND ART

Mass spectrometry has been known as a technique for identifying and quantifying a substance contained in a sample. The mass spectrometry is often combined with a separation device, such as a liquid chromatograph (LC), a gas chromatograph (GC), or a capillary electrophoresis (CE) separation device, so as to detect, particularly, a plurality of target substances, mixed with each other, in a sample. Examples of such a combination encompass a liquid chromatography/mass spectrometer (LC/MS), and a liquid chromatography/tandem mass spectrometer (LC/$MS^n$).

In recent years, mass spectrometers, such as the LC/MS, have been improved in performance. For example, a mass spectrometer having a high analysis speed or high detection sensitivity, and a mass spectrometer realizing widely targeted analysis have been developed. The mass spectrometer having a high analysis speed can deal with a large number of samples due to a reduction in a period of time necessary for detection per substance. Further, the mass spectrometer having high detection sensitivity can detect a substance in a small amount, contained in a biological sample and the like. Furthermore, the mass spectrometer realizing widely targeted analysis allows a so-called "omics analysis" (albeit only partially).

Waters Corp., for example, already developed an application which allows simultaneous analysis with the use of such a device.

CITATION LIST

Non-Patent Literature 1

"Quanpedia", [online], Waters Corp., [Search Date: Mar. 30, 2010), Internet Address <URL: http://www.waters.com/waters/nav.htm?cid=10148049>

SUMMARY OF INVENTION

Technical Problem

However, the high analysis speed, the high detection sensitivity, and the widely targeted analysis cannot be realized simultaneously due to their contradictory relationship. For example, in order to achieve a higher analysis speed throughout a whole process, it is necessary to detect a larger number of substances in one measurement. This, however, reduces a period of time for detection per substance, so that the detection sensitivity is reduced. Further, in order to achieve higher detection sensitivity, it is necessary to take a longer time for detection per substance. This, however, reduces the number of substances detectable within a certain period of time. That is, it becomes necessary to carry out the measurement a plurality of times. As a result, the analysis speed becomes lower. Meanwhile, in the case of the widely targeted analysis with high detection sensitivity, the analysis speed becomes lower due to a large number of sorts of target substance. Further, in order to realize the widely targeted analysis at a higher analysis speed, it is necessary to reduce a period of time for detection per substance. This causes the detection sensitivity to be lower.

For the reasons described above, it is important to manage measurement scheduling so that the analysis speed, the detection sensitivity, and the analysis range are appropriately managed. For example, for measurement of 400 substances per sample, if an upper limit of the number of substances detectable in one measurement is set to be 40, it is possible to detect all of the substances by carrying out the measurement ten times.

The mass spectrometer can detect a plurality of substances in parallel by setting a plurality of channels thereto. In the present specification, "channel" is a condition per substance, with which the mass spectrometer detects a corresponding substance. Further, "the number of channels" or "channel number" is the number of condition values, each indicating a specific condition (mass number etc.), and is synonymous with the number of substances to be measured. In the present specification, a set of channels, corresponding to respective substances that are simultaneously detected, is called "function". The function, constituted by a plurality of channels, has a start time which is an earliest detection start time among those of the plurality of channels, and an end time which is a latest detection end time among those of the plurality of channels. In the present specification, a range from the start time to the end time of the function is called "function range". Further, a set of one or more functions is called "measurement group". Note that a period of time during which each of the substances is introduced into the mass spectrometer has a corresponding width (peak width), and a start time and an end time of a period of time defined by the peak width are called "detection start time" and "detection end time", respectively.

The mass spectrometer carries out one measurement per measurement group. In a case where the number of channels detectable in parallel is set to be 40 and a measurement group is constituted by two functions each of which is constituted by 40 channels, it is consequently possible to measure 80 channels in one measurement.

In a case where one measurement group includes two or more functions and a time interval (F-F time) between the functions is more than 0 (F-F time>0), it is possible to extend each of the function ranges of the functions. On the other hand, in a case where the time interval between the functions is less than 0 (F-F time<0), a detection time range of these functions becomes shorter during a period of time in which function ranges of these functions overlap each other. This reduces the detection sensitivity. Therefore, in the case where one measurement group includes two or more functions, it is preferable to set the time interval between neighboring functions to be more than 0 (F-F time>0).

As described above, a measurement group is made in consideration of the detection sensitivity and the number of target substances to be detected in one measurement. In this case, however, if there is a plurality of target substances to be measured, the number of combinations of measurement groups becomes quite large. Therefore, it is substantially impossible to manually create a measurement schedule. In other words, by automating an arrangement of the measurement schedule, it becomes possible to manage the analysis speed, the detection sensitivity, and the widely targeted analysis.

Existing applications (such as Quanpedia made by Waters Corp., etc.) cannot allow automatic management of the measurement schedule for realizing the high analysis speed, the high detection sensitivity, and the widely targeted analysis. Accordingly, there has been demand for a device for automatically managing a measurement schedule, such as an arrangement of a measurement group (the number of channels, the number of functions) and the number of times that the measurement is carried out, and also demand for a system for carrying out mass spectrometry analysis on the basis of the measurement schedule.

Note that the aforementioned problem of scheduling management arises not only in a field of the mass spectrometer but also an entire field of scheduling management for determining when each of a plurality of processing targets is subjected to a process, e.g. scheduling management as to used hours of each of conference rooms or assembly halls, scheduling management of shifts of part-timers, etc.

The present invention is made in view of the problem. An object of the present invention is to provide a scheduling device which can carry out scheduling of process execution periods of time, which are included in plural pieces of processing target data, respectively.

Solution to Problem

In order to attain the object, the inventors of the present invention developed: a scheduling device which creates, in advance, a measurement group(s) the number of which is equal to the number of times the measurement is carried out; and a mass spectrometry system for carrying out mass spectrometry analysis on the basis of the measurement group(s) (measurement schedule).

The scheduling device looks up a retention time (a time of a peak top during a detection peak period of time which is a time range between a detection start time to a detection end time) of each of substances (which are set as channels), so as to group channels whose retention times are close to each other into the same function (first grouping).

Further, the scheduling device finds the F-F time between the functions (a time interval between a function start time of a function and a function end time of a following function) generated by the first grouping. By comparing the F-F times with a predetermined condition (arbitrarily determined by a user) stored in the scheduling device, the scheduling device groups the functions into the measurement group(s) so that functions which are not close to each other are grouped into the same measurement group (second grouping).

Both the substance separation device and the mass spectrometer receive data including information on the measurement group(s) from the scheduling device, so as to carry out, respectively, sample introduction and the measurement a number of times determined in accordance with the measurement group(s) thus created.

As described above, the scheduling device carries out the first grouping and the second grouping so as to determine the measurement schedule, and the substance separation device and the mass spectrometer carry out the sample introduction and the measurement, respectively, in accordance with the information on the measurement schedule.

In order to attain the object, a scheduling device of the present invention includes: a first grouping section for (i) sorting out plural pieces of substance data in a mass spectrometer, the plural pieces of substance data corresponding to a plurality of substances respectively, each of the plural pieces of substance data indicating a plurality of features of its corresponding substance, the first grouping section sorting out the plural pieces of substance data on the basis of at least one of a retention time, a detection start time, and a detection end time that are included in each of the plural pieces of substance data, and (ii) grouping the plural pieces of substance data into a plurality of first data groups so that (1) an upper limit of the number of pieces of substance data per first data group is equal to the number of channels of the mass spectrometer, and (2) each of the plurality of first data groups includes pieces of substance data that are successively arrayed in an order resulting from the sorting; a second grouping section for (i) finding, for each of the plurality of first data groups, a measurement time range which is a time range between an earliest detection start time among those of pieces of substance data, included in that first data group, and a latest detection end time among those of the pieces of substance data, included in that first data group, and (ii) grouping the plurality of first data groups into a second data group(s) so that an interval between time ranges of neighboring first data groups among the plurality of first data groups is not less than a first specified value set in advance; and an output data generation section for generating a measurement schedule for (i) introducing a target sample of measurement into a substance separation device on the basis of the second data group(s), and (ii) controlling the channels of the mass spectrometer so that substances corresponding to the plural pieces of substance data, included in each of the plurality of first data groups, are subjected to mass spectrometry analysis.

According to the configuration, the scheduling device groups the plural pieces of substance data into the plurality of first data groups so that pieces of substance data, having detection times close to each other, are grouped into the same first data group (first grouping). Further, the scheduling device determines, for each of the plurality of first data groups, the measurement time range on the basis of the earliest detection start time among those of pieces of substance data, included in that first data group, and the latest detection end time among those of pieces of substance data, included in that first data group. Then, the scheduling device groups the plurality of first data groups into the second data group(s) so that a time interval between first data groups belonging to the same second data group is not less than the first specified value (second grouping) set in advance. Because of this, the first data groups whose measurement time ranges are close to each other are grouped into different second data groups, respectively. Then, the scheduling device generates, as the output data, a measurement schedule for (i) introducing the target sample into the substance separation device on the basis of the second data group(s), and (ii) controlling the channels of the mass spectrometer to carry out the mass spectrometry analysis with respect to the substances corresponding to the plural pieces of substance data included in each of the first data groups. The mass spectrometer can carry out the mass spectrometry analysis on the basis of the output data. Each of the plural pieces of substance data is included in one of the first data groups, and each of the first data groups is included in one of the second data group(s). Therefore, it is possible to carry out, for the mass spectrometry analysis, the scheduling as to (i) with which sample introduction, carried out by the separation device, that substance is measured, and (ii) how to control the channels in the measurement.

More specifically, for example, in a case where each of the plural pieces of substance data includes a value of an acquisition voltage (e.g. a cone voltage) which is set to the mass spectrometer when that substance is subjected to the mass separation, it is possible to supply the acquisition voltage to the mass spectrometer in accordance with the first data group and the second data group both of which correspond to the piece of substance data. Accordingly, in the measurement with respect to introduction of a specific sample, it is possible to realize scheduling as to which acquisition voltage should be set to the mass spectrometer during a measurement time range of a specific first data group.

Further, in a case where each of the plural pieces of substance data includes a value of a specific mass number, which is a target value to be detected by the mass spectrometer, it is possible to supply the value of the mass number to the mass spectrometer in accordance with the first data group and the second data group both of which correspond to that piece of substance data. Accordingly, in the measurement with respect to the introduction of a specific sample, it is possible to realize scheduling as to which mass number should be detected by the mass spectrometer during the measurement time range of a specific first data group. Note that in the mass spectrometer which is set to detect a specific mass number, a sort of parameter corresponding to an actual set mass number varies in accordance with a mass separation method of the mass spectrometer. For example, in a case of a mass spectrometer including a quadrupole-type separation section, the parameter is a voltage applied to four electrodes, meanwhile, in a case of a mass spectrometer including a time-of-flight type separation section, the parameter is a target flight period of time of the measurement. Generally, information on the mass number is inputted into the mass spectrometer, so that the mass spectrometer sets the parameter corresponding to the information on the mass number.

Further, in a case where the mass spectrometer is a tandem mass spectrometer and each of the plural pieces of substance data includes a value of an acceleration voltage (e.g. collision energy) which is set to the mass spectrometer, it is possible to supply the value of the acceleration voltage to the mass spectrometer in accordance with the first data group and the second data group both of which correspond to that piece of substance data. Accordingly, in the measurement with respect to the introduction of a specific sample, it is possible to realize scheduling as to which acceleration voltage should be set to the mass spectrometer during the measurement time range of a specific first data group.

Note that in a case where the scheduling device further includes a substance data storage section, it is possible to (i) store the plural pieces of substance data into the substance data storage section, and add information to the plural pieces of substance data, and then (ii) read out from the substance data storage section at the time of the first grouping. Alternatively, the plural pieces of substance data may be inputted by a user immediately before the scheduling is carried out, or may be received from an external device via a communication network.

Further, in order to attain the object, a scheduling method of the present invention, includes the steps of: (i) grouping plural pieces of substance data in a mass spectrometer into a plurality of first data groups, the plural pieces of substance data corresponding to a plurality of substances, respectively, each of the plural pieces of substance data indicating a plurality of features of its corresponding substance, the grouping including (a) sorting out the plural pieces of substance data on the basis of at least one of a retention time, a detection start time, and a detection end time that are included in each of the plural pieces of substance data, and (b) grouping the plural pieces of substance data into a plurality of first data groups so that (1) an upper limit of the number of pieces of substance data per first data group is equal to a predetermined number of channels, and (2) each of the plurality of first data groups includes pieces of substance data that are successively arrayed in an order resulting from the sorting; (ii) grouping the plurality of first data groups into a second data group(s), the grouping including: (A) finding, for each of the plurality of first data groups, a measurement time range which is a time range between an earliest detection start time among those of pieces of substance data, included in that first data group, and a latest detection end time among those of the pieces of substance data, included in that first data group, and (B) grouping the plurality of first data groups into a second data group(s) so that an interval between time ranges of neighboring first data groups among the plurality of first data groups is not less than a first specified value set in advance; and (iii) generating a measurement schedule for (I) introducing a target sample of measurement into a substance separation device on the basis of the second data group(s), and (II) controlling the channels of the mass spectrometer so that substances corresponding to the plural pieces of substance data, included in each of the plurality of first data groups, are subjected to mass spectrometry analysis.

According to the configuration, it becomes possible to achieve the same effects as those of the scheduling device.

In order to attain the object, a mass spectrometry system of the present invention includes: the scheduling device described above; a substance separation device; and a mass spectrometer, the scheduling device supplying the substance separation device and the mass spectrometer with the measurement schedule as output data, the substance separation device receiving a measurement sample per second data group, the mass spectrometer carrying out mass spectrometry analysis by controlling the channels in accordance with each of the plurality of first data groups.

The scheduling device of the present invention can be realized by a computer. In this case, the scope of the present invention includes: a program for realizing the scheduling device of the present invention on the computer by causing the computer to function as each of the sections; and a computer-readable storage medium in which such a program is stored.

In order to attaint the object, a scheduling device of the present invention may include: a processing target data storage section for storing plural pieces of processing target data, corresponding to a plurality of processing targets, respectively, each of which includes a process execution period of time in which a processing target corresponding that piece of the processing target data is allowed to be subjected to a process; a first grouping section for (i) sorting out the plural pieces of processing target data on the basis of the process execution period of time, included in each of the plural pieces of processing target data, and (ii) grouping the plural pieces of processing target data into a plurality of first data groups so that each of the plurality of first data groups includes pieces of substance data that are successively arrayed in an order resulting from the sorting; a second grouping section for (i) setting, as a process execution time range of each of the plurality of first data groups, a range indicated by a process execution period of time included in each of pieces of processing target data included in that first data group, and (ii) grouping the plurality of first data groups into a second data group(s) so that an interval between process execution time ranges of neighboring first data groups among the plurality of first data groups is not less than a first specified value set in advance; and an output data generation section for generating a process execution schedule for carrying out, on the basis of the plurality of first data groups and the second data group(s), processes with respect to processing targets corresponding to the plural pieces of processing target data, respectively.

According to the configuration, it is possible to realize, for a plurality of processing targets, scheduling as to which processing target is processed in which period of time during a period of time of a process execution group.

Advantageous Effects of Invention

With the scheduling device of the present invention, it becomes possible to easily carry out scheduling for mass spectrometry analysis.

BRIEF DESCRIPTION OF DRAWINGS

FIG. 4(*a*) through (*f*) of FIG. 4 are tables each schematically illustrating a structure of data used in the scheduling device in accordance with the embodiment of the present invention.

FIG. 10 is a table illustrating an example of output data in accordance with the embodiment of the present invention.

FIG. 11 is a view illustrating another example of output data in accordance with the embodiment of the present invention.

FIG. 16 is a view illustrating an example of output data in accordance with another embodiment of the present invention.

DESCRIPTION OF EMBODIMENTS

Embodiment 1

One embodiment of the present invention is described below with reference to FIGS. 1 through 14.

(Configuration of Mass Spectrometry System)

Figure 1:
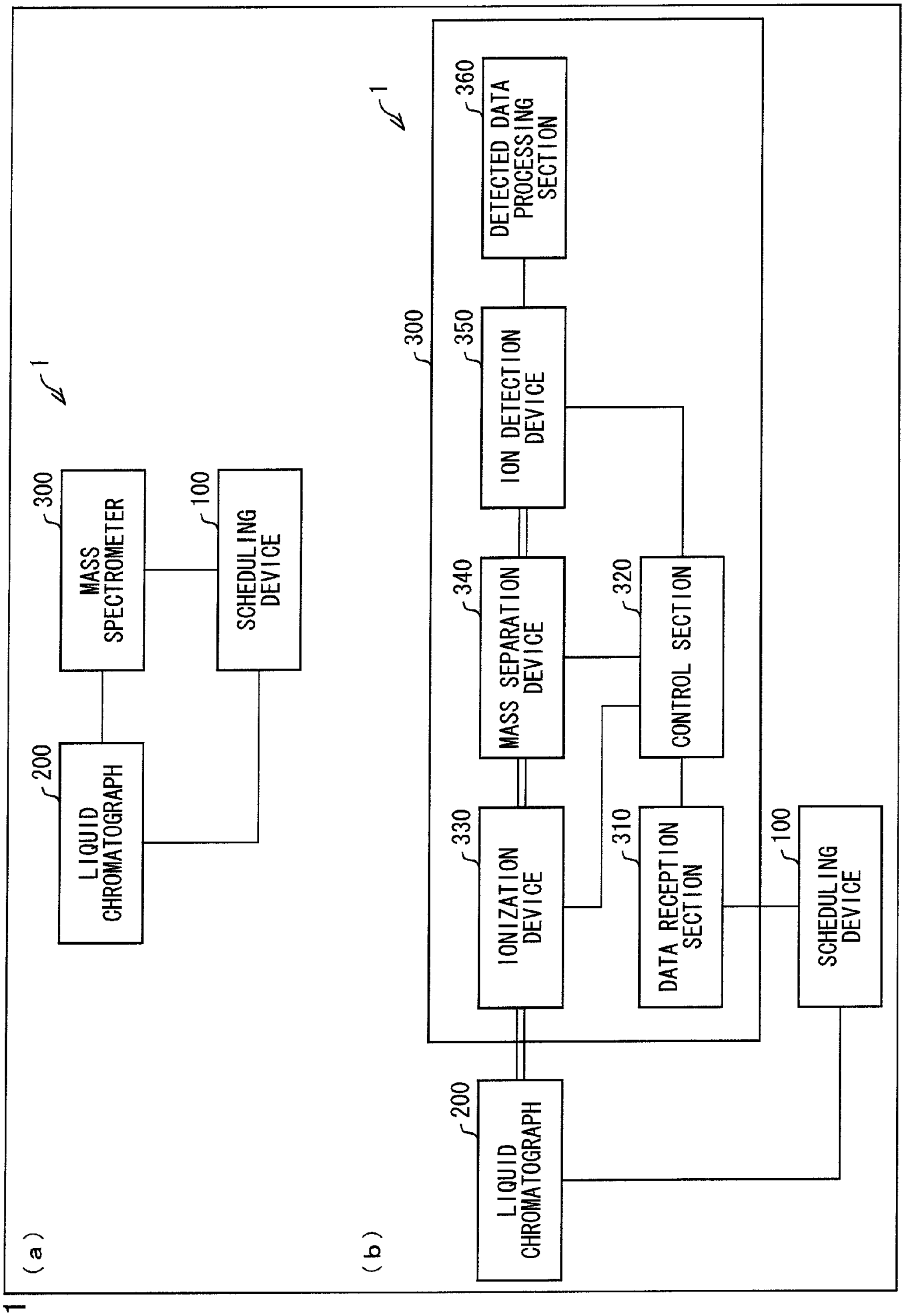
FIG. 1 is a block diagram illustrating one embodiment of the present invention: (*a*) of FIG. 1 is a block diagram illustrating a configuration of a mass spectrometry system; and (*b*) of FIG. 1 is a block diagram illustrating an internal configuration of a mass spectrometer illustrated in (*a*) of FIG. 1.

First, the following description deals with a mass spectrometry system in accordance with the present embodiment with reference to FIG. 1.

(*a*) of FIG. 1 is a view schematically illustrating a configuration of the mass spectrometry system in accordance with the present embodiment. A mass spectrometry system 1 includes a scheduling device 100, a liquid chromatograph (substance separation device) 200, and a mass spectrometer 300 (see (*a*) of FIG. 1).

(Configuration of Liquid Chromatograph)

The liquid chromatograph 200 is a device for separating each substance in a sample introduced into the liquid chromatograph 200, on the basis of the properties of that substance, in a case where the sample, which is a target of analysis, contains a mixture of a plurality of substances to be detected. In the present embodiment, the liquid chromatograph 200 is an ultra performance liquid chromatograph. However, the liquid chromatograph 200 is not limited to this, and may be a high performance liquid chromatograph, a capillary flow liquid chromatograph, or a nanoflow liquid chromatograph. Further, in place of the liquid chromatograph, it is possible to use a gas chromatograph (GC), an electrophoretic separation device (such as a capillary electrophoretic device), or an ion chromatograph. After being introduced into the liquid chromatograph 200 at an introduction time t, each of the substances in the sample is retained in the liquid chromatograph 200 for a period of time indicated by a retention time δt in accordance with the properties of that substance, and then is introduced, at a time t+δt, into a mass spectrometer 300 coupled with the liquid chromatograph 200. That is, the substances in the sample introduced into the liquid chromatograph 200 are introduced into the mass spectrometer 300 in an order from a substance having the earliest retention time to a substance having the latest retention time.

Note that in a case where measurement is carried out by use of the mass spectrometer 300 as a detector, a retention time of each of the substances is defined as a time when a speed (an introduction amount per unit time) at which that substance is introduced into the mass spectrometer 300 becomes highest (peak top). Further, a detection start time can be defined as a time when the speed at which that substance is introduced into the mass spectrometer 300 becomes more than a predetermined threshold value, and a detection end time can be defined as a time when the speed at which that substance is introduced into the mass spectrometer 300 becomes less than the predetermined threshold value. Alternatively, both of the detection start time and the detection end time can be assumed from the retention time and a peak width of that substance.

(Configuration of Mass Spectrometer)

The mass spectrometer 300 is a device for (i) ionizing a substance received from the liquid chromatograph 200, and (ii) separating and detecting an ion of the substance in accordance with a mass number/electric charge (m/z) ratio. The mass spectrometer 300 of the present embodiment is a tandem mass spectrometer (MS/MS) which carries out the measurement by selected reaction monitoring (SRM), which is also called multiple reaction monitoring (MRM) in some cases. In SRM, the following (i) and (ii) are selectively measured: (i) a mass number corresponding to an ion of the target substance in the sample and (ii) a mass number of another ion obtained in such a manner that the aforementioned ion is cleaved due to a collision between that ion and an inactive gas, such as argon. In the present specification, "mass number/electric charge" is merely referred to as "mass number" for the sake of simple explanation. Alternatively, the mass spectrometer 300 may be (i) a mass spectrometer which carries out the measurement by selected ion monitoring (SIM), by which a mass number corresponding to an ion of the target substance in the sample is selectively measured, or (ii) a mass spectrometer which scans mass numbers within a predetermined mass number range so as to detects all ions whose mass numbers fall within the predetermined mass number range, i.e. Scan mode.

(*b*) of FIG. 1 is a block diagram illustrating a configuration of the mass spectrometer 300 of the present embodiment. The mass spectrometer 300 includes: a data reception section 310; a control section 320; an ionization device 330; a mass separation device 340; an ion detection device 350; and a detected data processing section 360 (see (*b*) of FIG. 1). In (*b*) of FIG. 1, double lines between devices of the mass spectrometer 300, and a double line between the liquid chromatograph 200 and the ionization device 330 indicate a flow of the sample (substances or ions derived from the substances) received from the liquid chromatograph 200, while straight lines between devices and sections of the mass spectrometer 300 indicate a flow of data.

The data reception section 310 is a processing section for receiving output data transmitted from the scheduling device 100. The data reception section 310 transmits the data to the control section 320.

The control section 320 receives the data from the data reception section 310, and then, by looking up information included in the data, controls the ionization device 330, the mass separation device 340, and the ion detection device 350.

The ionization device 330 receives a substance from the liquid chromatograph 200, and ionizes the substance. Then, the ionization device 330 supplies the target substance thus ionized to the mass separation device 340.

The mass separation device 340 causes the target substance ionized by the ionization device 330 to be subjected to mass separation. Examples of a general type of the mass separation device 340 includes a magnetic-sector type, a quadrupole type, an ion-trap type, a time-of-flight type, and an ion-cyclotron type. The ion is mass-separated while the ion passes through the mass separation device 340. Then, the ion reaches the ion detection device 350.

The ion detection device 350 detects the ion mass-separated by the mass separation device 340. The ion detection device 350 transmits information on the ion thus detected to a detected data processing section 360.

The detected data processing section 360 converts the information on the ion, received from the ion detection device 350, into mass spectrum information. Note that the information obtained by the conversion carried out by the detected data processing section 360 can be presented to a user via output means (not illustrated) such as a monitor or a printer.

(Configuration and Operation of Scheduling Device)

The scheduling device 100 creates a schedule which indicates timing for the mass spectrometer 300 to detect each of the substances received from the liquid chromatograph 200, and outputs, to the mass spectrometer 300, the schedule and a measurement condition for each of the substances. The mass spectrometer 300 carries out mass spectrometry analysis on the basis of the measurement schedule received from the scheduling device 100. Further, on the basis of the measurement schedule, the scheduling device 100 controls the number of times that the measurement is carried out by the liquid chromatograph 200 and the mass spectrometer 300.

Figure 2:
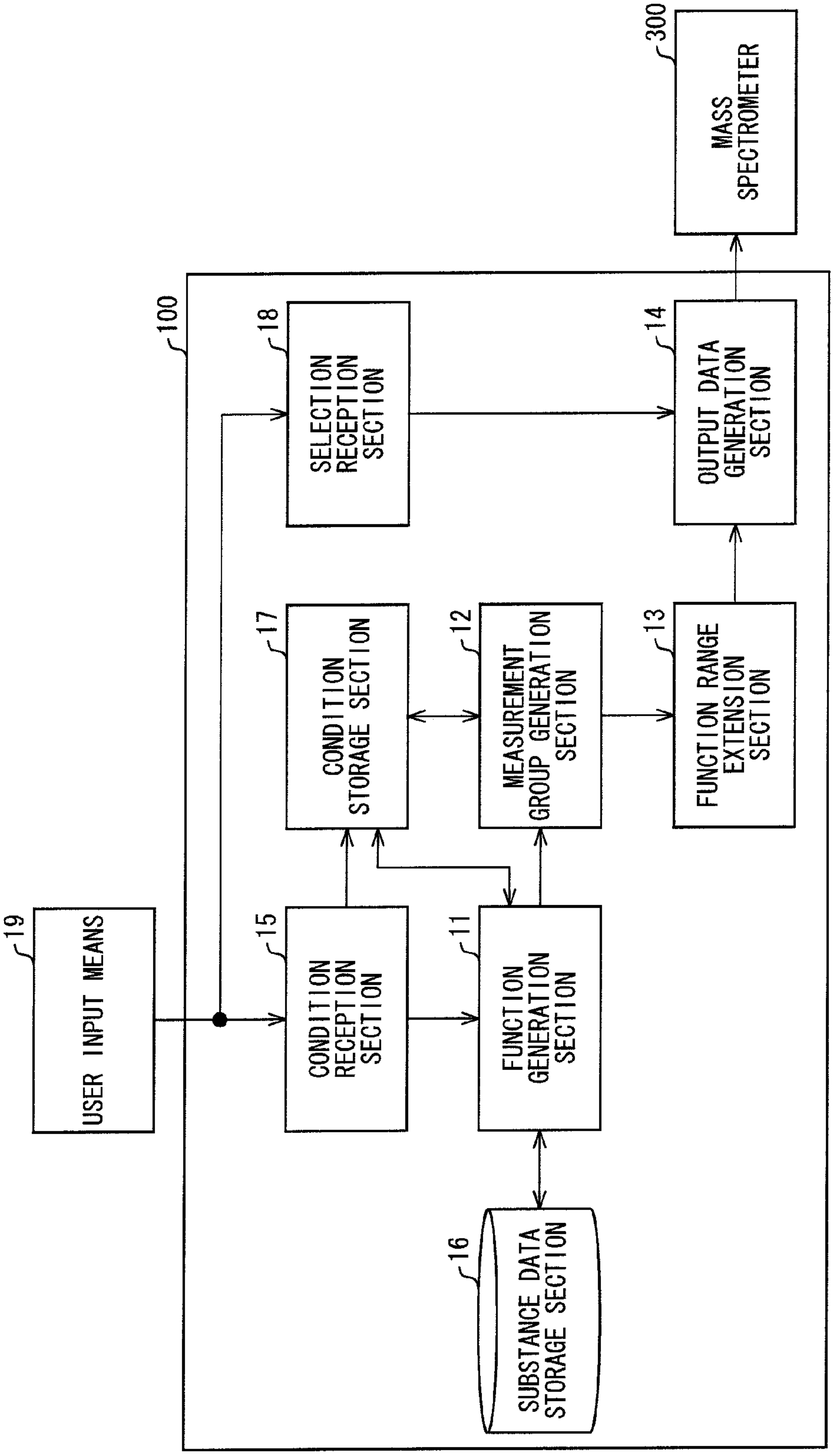
FIG. 2 is a block diagram illustrating a configuration of a scheduling device in accordance with the embodiment of the present invention.
Figure 3:
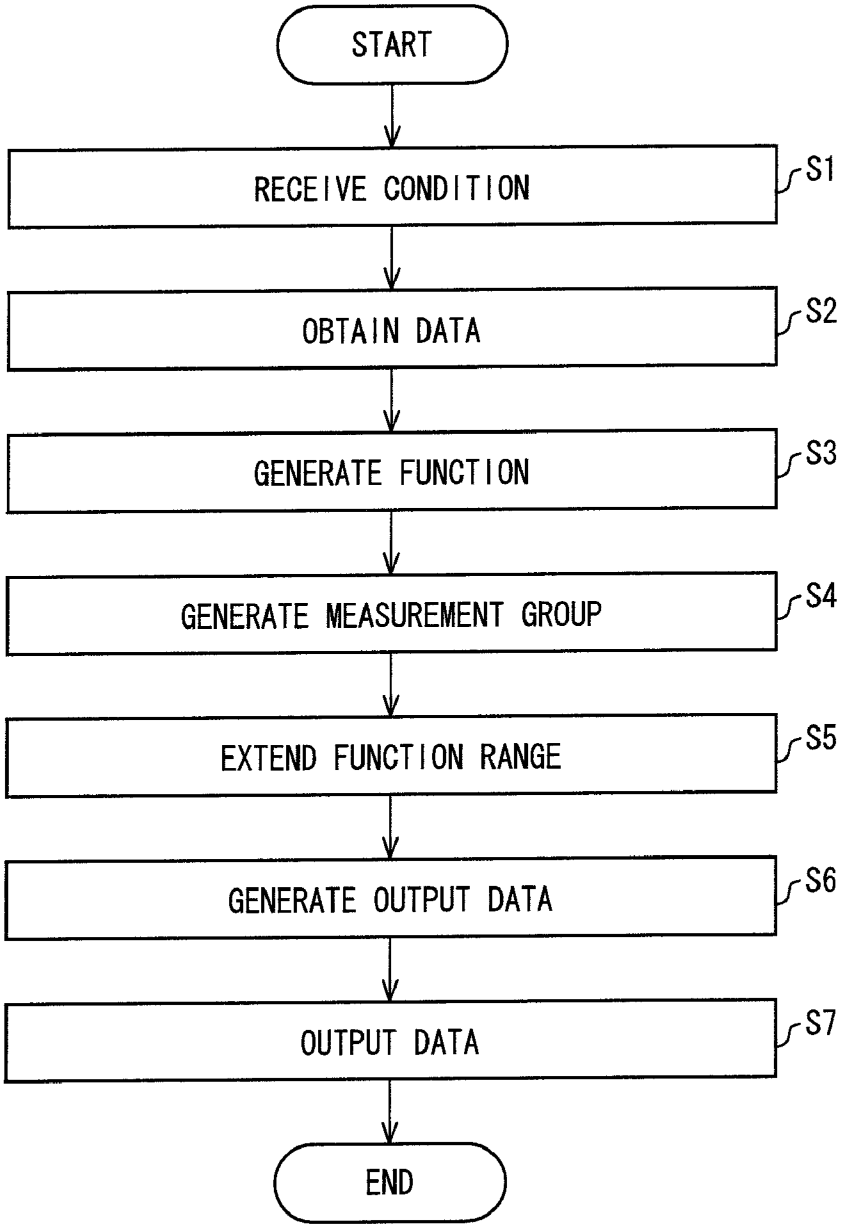
FIG. 3 is a view illustrating a flow of a process carried out by the scheduling device in accordance with the embodiment of the present invention.

The following description deals with a configuration and operation of the scheduling device 100 with reference to FIGS. 2 and 3. FIG. 2 is a block diagram illustrating a configuration of the scheduling device 100. FIG. 3 is a view illustrating a flow of a process carried out by the scheduling device 100.

The scheduling device 100 includes: a function generation section (first grouping section) 11; a measurement group generation section (second grouping section) 12; a function range extension section (second grouping section) 13; an output data generation section 14; a condition reception section (first data reception section, second data reception section) 15; a substance data storage section 16; a condition storage section 17; and a selection reception section 18 (see FIG. 2).

The following description deals with an outline of the operation of the scheduling device 100 with reference to FIGS. 2 and 3, and each of the sections of the scheduling device 100 is explained later in detail.

The condition reception section 15 receives, from the user: information specifying which substance is to be measured; information indicating how many channels are to be included in a function (second specified value); and information indicating an interval between neighboring functions (first specified value) (S1 of FIG. 3). The condition reception section 15 transmits such conditions thus received to the function generation section 11. Alternatively, the condition reception section 15 transmits the conditions to the condition storage section 17 so that the conditions are stored in the condition storage section 17.

The function generation section 11 obtains data of a target substance to be measured from the substance data storage section 16 in accordance with the information specifying which substance is to be measured, received via the condition reception section 15 (S2 of FIG. 3).

The function generation section 11 looks up the condition (the number of channels to be included in a function) stored in the condition storage section 17, so as to group pieces of substance data thus obtained into functions. Specifically, the function generation section 11 sorts out the pieces of substance data in accordance with each of retention times of channels. On the basis of an order resulting from the sorting, the function generation section 11 groups the pieces of substance data into the functions so that pieces whose detection time ranges overlap each other are grouped into the same function (S3 of FIG. 3) (first grouping). Then, the function generation section 11 writes, on a substance data table, information on the functions thus generated (function information). Next, the function generation section 11 supplies, to the measurement group generation section 12, the substance data table to which the function information has been added.

The measurement group generation section 12 looks up (i) the substance data table to which the function information has been added, and (ii) the condition stored in the condition storage section 17, so as to group the functions generated by the function generation section 11 into measurement groups in accordance with the information on the interval between the functions (which may be a threshold value arbitrarily determined by the user)(S4 of FIG. 3) (second grouping). The measurement group generation section 12 writes, on the substance data table received from the function generation section 11, information on the measurement groups thus generated (measurement information). Next, the measurement group generation section 12 transmits, to the function range extension section 13, the substance data table to which the measurement group information has been added.

The function range extension section 13 looks up the substance data table, to which the measurement group information has been added, received from the measurement group generation section 12, so as to re-set a start time and an end time of each of the functions in each of the measurement groups. That is, the function range extension section 13 extends the function ranges (described later in detail) (S5 of FIG. 3). The function range extension section 13 writes, on the substance data table received from the measurement group generation section 12, information on the function ranges thus extended (function range information). Next, the function range extension section 13 transmits, to the output data generation section 14, the substance data table to which the information on the function ranges thus extended has been added.

The output data generation section 14 converts, into output data, the substance data table received from the function range extension section 13 so that the substance data table can be used as the output data by the mass spectrometer 300 and the user (S6 of FIG. 3). The output data generation section 14 supplies the output data thus generated to the mass spectrometer 300 or the user (S7 of FIG. 3).

Each of the sections of the scheduling device 100 is described below in detail.

(Substance Data Storage Section)

The substance data storage section 16 is a database in which channels, corresponding to the respective substances as the pieces of substance data, are stored. The substance data storage section 16 reads out the channels in response to a substance data request (query) given from the function generation section 11, and then supplies the channels to the function generation section 11. Each of the channels includes information (attribute values) indicating the followings: (1) a substance ID; (2) a substance name; (3) a retention time; (4) a detection start time (assumed from the retention time and a peak width); (5) a detection end time (assumed from the retention time and the peak width); (6) a dwell time (assumed based on detection sensitivity); (7) an ionization mode (positive, negative); (8) a mass number of a precursor ion; (9) a mass number of a product ion; (10) a cone voltage (CV); and (11) collision energy (CE). Here, "dwell time" of a substance is a data acquisition time per 1 data point, necessary for the mass spectrometer 300 to detect that substance (ion). Further, "cone voltage (CV)" is an acquisition voltage necessary for the mass separation device 340 to acquire a target ion. Furthermore, "collision energy (CE)" is energy (acceleration voltage) used to cleave an ion due to a collision between the ion and an inactive gas or the like, which ion has been subjected to the first mass separation (tandem mass separation).

Note that the substance data file, looked up by the substance data storage section 16, may be a CSV (Comma-Separated Values) file in which a comma is provided between neighboring attribute values among the attribute values of (1) through (10) so that the attribute values (1) through (10) are separated from each other, for example. However, a form of the substance data file is not limited to this. For example, the substance data file may be: an XML (Extensible Markup Language) file in which each of the attribute values of (1) through (10) is provided between a start tag and an end tag, which have been associated with an attribute name in advance, so that the attribute values of (1) through (10) are separated from each other; a TSV (Tab-Separated Values) in which a tab is provided between neighboring attribute values among the attribute vales of (1) through (10) so that the attribute values (1) through (10) are separated from each other, or the like.

Further, the substance data request received by the substance data storage section 16 may include a conditional expression representing a condition which should be met by the pieces of substance data to be read out from the substance data file. The substance data storage section 16 selectively reads out, from the pieces of substance data, stored in the substance data file, only pieces of substance data which meet the conditional expression included in the substance data request thus received, and then supplies the pieces of substance data thus read out to the function generation section 11. Note that how to selectively read out only the pieces of substance data which meet the conditional expression included in the substance data request thus received is a technique conventionally used with a well-known data base, so that detailed explanations thereof are omitted here.

Further, in the present embodiment, the substance data storage section 16 is provided in the scheduling device 100 (see FIG. 2). Note, however, that the present invention is not limited to this. That is, in the above descriptions, the function generation section 11 obtains the pieces of substance data from the substance data storage section 16 (internal database) provided in the scheduling device 100. However, alternatively, the function generation section 11 can obtain the pieces of substance data from the substance data storage section (external database) which is connected to the scheduling device 100 via a communication network. In this case, it is also possible to obtain the pieces of substance data suitable for the measurement, and therefore obtain a proper measurement result.

(Function Generation Section)

The function generation section 11 is a module for (i) obtaining, from the substance data storage section 16, the pieces of substance data in accordance with the information specifying which substance is to be measured, the information being determined by the user, and (ii) grouping the pieces of substance data, obtained from the substance data storage section 16, into the functions, i.e. data groups. Here, each of the functions generated by the function generation section 11 is such a group of pieces of substance data that the pieces of substance data are ordered in accordance with their retention times, detection start times, or detection end times. In other words, the function generation section 11 groups the pieces of substance data, obtained from the substance data storage section 16, into the functions so that among the pieces of substance data, ordered in accordance with their retention times, detection start times, or detection end times, neighboring pieces of substance data belong to the same function.

The function generation section 11 groups the pieces of substance data into the functions so that each of the functions includes pieces of substance data as many as possible under the following conditions: (i) the number of pieces of substance data, belonging to each of the functions, is not more than the number of channels (hereinafter, referred to as "setting channel number") set in advance; and (ii) pieces of substance data, having detection time ranges which do not overlap each other, do not belong to the same function. Note that the setting channel number is set to be not more than the maximum number of channels settable to the mass spectrometer. The setting channel number has been stored in the condition storage section 17 in advance, and the function generation section 11 can read out the setting channel number from the condition storage section 17 so as to generate the functions.

A function of the function generation section 11 can be realized by the following steps, for example. Note that each of the following steps is information processing carried out by the function generation section 11 with respect to the table (array) stored in a main storage device (a main storage device 130, later described with reference to FIG. 14). In the following example, the pieces of substance data are ordered in accordance with their retention times.

In Step 1, a group of pieces of substance data, obtained from the substance data storage section 16, are stored in the main storage device as a table (array). (*a*) of FIG. 4 shows an example of the group of pieces of substance data (table), stored in the main storage device. In a case where the pieces of substance data are ordered in accordance with their substance IDs, the jth attribution of the ith piece of substance data is a[i, j]. For example, a retention time a[2, 3], which is the third attribution of the second piece of substance data in the order in accordance with the substance IDs, is 0.15 (min).

In Step 2, the group of pieces of substance data, stored in the main storage device as the table, are ordered in accordance with their retention times. (*b*) of FIG. 4 shows an example of the group of pieces of substance data after the group of pieces of substance data are ordered in accordance with their retention times. After Step 2, a[i, j] is the jth attribution of the ith piece of substance data in the order in accordance with the retention times. For example, a retention time a[2, 3], which is the third attribution of the second piece of substance data in the order in accordance with the retention times, is 0.17 (min). Note that an algorithm for the ordering is not particularly limited. The algorithm may be arbitrarily selected from well-known algorithms.

In Step 3, each variable is initialized. Specifically, a variable k, representing a function number of the function being generated, is set to be 1, and a variable m, representing the number of pieces of substance data, belonging to the function being generated, is set to be 0. Further, a variable M, representing the setting channel number, is substituted by a setting value read out from the condition storage section 17. After that, the following Steps 4 through 6 are repeated for each ith (i is not less than 1 but not more than n) piece of substance data so that all of the pieces of substance data are processed. When all of the ith pieces of substance data are subjected to the following processes of Steps 4 through 6, a table (array) shown in (*c*) of FIG. 4 can be obtained.

In Step 4, it is determined whether or not inequities of "m<M" and "a[i, 4]<a[i−1, 5]" are satisfied. Due to the former inequity, it can be determined whether or not the number m showing how many pieces of substance data are included in the function being generated is less than the setting channel number M. Due to the latter inequity, it can be determined whether or not a start time (detection start time) a[i, 4] of a detection time range of the ith piece of substance data, is less than an end time (detection end time) a[i−1, 5] of a detection time range of the (i−1)th piece of substance data, i.e. whether or not the detection time range of the ith piece of substance data and the detection time range of the (i−1)th piece of substance data overlap each other. In a case where a result of the determination is true, the process proceeds to Step 5. On the other hand, in a case where the result of the determination is false, the process proceeds to Step 6. Note that in a case of i=1, the process proceeds to Step 5 regardless of whether the result is true or false. Thus, in Step 4, it is confirmed whether or not the number of channels included in the function is equal to a value arbitrarily set by the user, and whether or not a detection time range of a piece of substance data and a detection time range of another piece of substance data overlap each other.

In Step 5, a value of the function number a[i, 12] of a function to which the ith piece of substance data should belong is set to be k, and then the number m of the pieces of substance data, belonging to the kth function, is incremented by only 1.

In Step 6, the value k is incremented by 1. Then, after the value of the function number a[i, 12] of the function to which the ith piece of substance data should belong is set to be k, a value of the number m of the pieces of substance data belonging to the kth function is set to be 1.

With the above processes, the function generation section 11 can generate the functions so that each of the functions meets the following conditions: (i) the number of pieces of substance data, belonging to that function, is not more than the setting channel number and (ii) pieces of substance data, having detection time ranges which do not overlap each other, do not belong to the same function.

Figure 5:
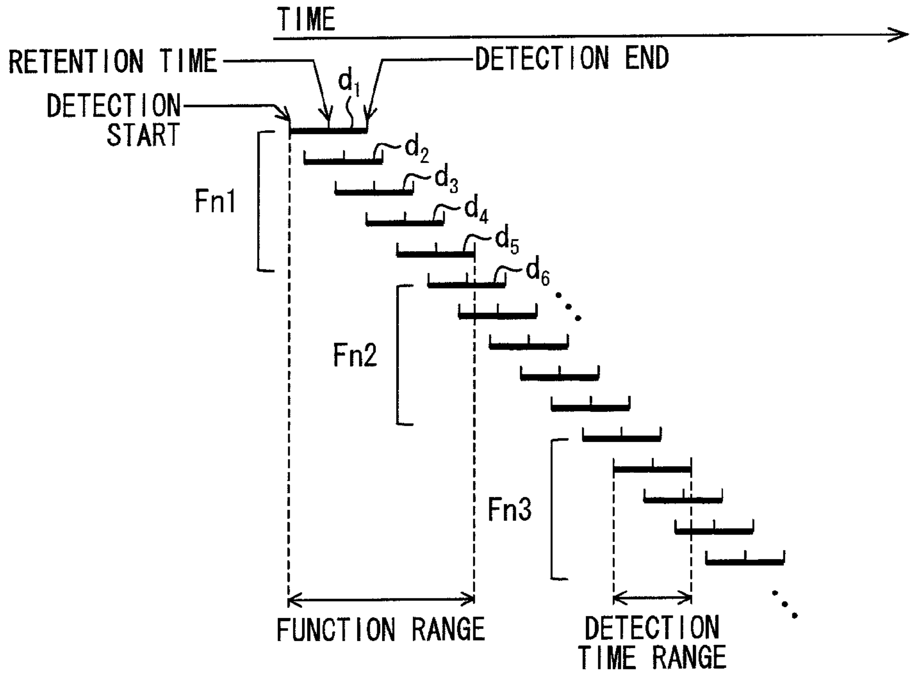
FIG. 5 is a view schematically illustrating how a function is generated by the scheduling device in accordance with the embodiment of the present invention.
Figure 6:
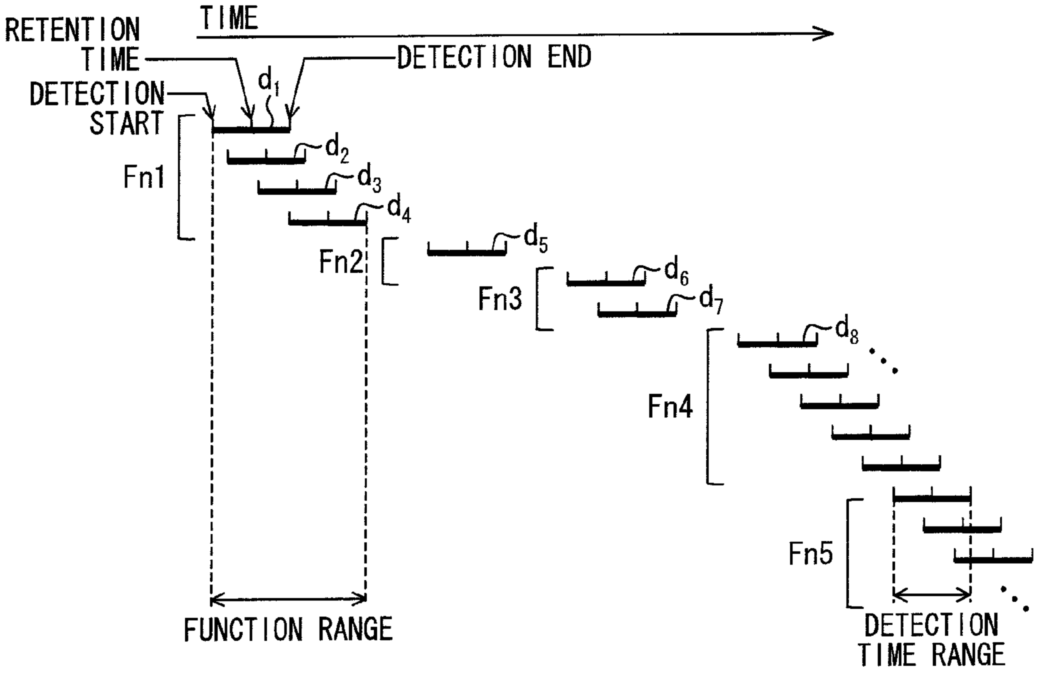
FIG. 6 is a view schematically illustrating how the function is generated by the scheduling device in accordance with the embodiment of the present invention, on the basis of pieces of substance data, which pieces of substance data are different from those of substance data used in FIG. 5.

Each of FIGS. 5 and 6 shows each of the pieces of substance data in such a manner that a detection time range of each of the pieces of substance data is represented by a straight line extending along a time axis. The following description deals with a function structure of the function obtained through the above processes by the function generation section 11, with reference to FIGS. 5 and 6. FIG. 5 shows an example of a function structure in a case where (i) the pieces of substance data are ordered in accordance with their retention times, and (ii) detection time ranges of neighboring pieces of substance data among the pieces of substance data overlap each other. FIG. 6 shows an example of a function structure in a case where (i) the pieces of substance data are ordered in accordance with their retention times, and (ii) detection time ranges of some neighboring pieces of substance data among the pieces of substance data do not overlap each other. In each of FIGS. 5 and 6, thick lines are arranged so as to extend along the time axis. Each of the thick lines is such that a leftmost end thereof shows a detection start time, a rightmost end thereof shows a detection end time, and an interval between the leftmost end and the rightmost end thereof shows a detection time range. Further, in FIG. 5, for example, a function range of a function Fn1 is a range between a detection start time of a piece $d_1$ of substance data and a detection end time of a piece $d_5$ of substance data. In FIGS. 5 and 6, all of the pieces of substance data are the same in length of the detection time range. Further, for each of the pieces of substance data, the retention time is located in the middle of the detection time range of that piece of substance data. Furthermore, either in FIG. 5 or in FIG. 6, it is assumed that the setting channel number is "5", for example.

In a case where the pieces of substance data are ordered in accordance with their retention times, and the detection time ranges of neighboring pieces of substance data among the pieces of substance data overlap each other, a mutual relationship between the pieces of substance data (detection time ranges), which pieces belong to each of the functions generated by the function generation section 11, is as shown in FIG. 5. The function generation section 11 obtains n pieces $d_1$, $d_2$, . . . $d_n$ of substance data from the substance data storage section 16. The function generation section 11 sequentially extracts, from the n pieces of substance data, 5 pieces of substance data in the order from a piece of substance data, having the earliest retention time, to a piece of substance data, having the fifth earliest retention time, so that the pieces $d_1$, $d_2$, . . . $d_5$ of substance data are extracted. The function generation section 11 groups the 5 pieces $d_1$, $d_2$, . . . $d_5$ of substance data thus extracted into a first function Fn1. Next, the function generation section 11 sequentially extracts, from n−5 pieces $d_6$, $d_7$, . . . $d_n$ of substance data, which have not been grouped into any functions, 5 pieces of substance data in the order from a piece of substance data, having the earliest retention time, to a piece of substance data, having the fifth earliest retention time, so that the pieces $d_6$, $d_7$, . . . $d_{10}$ of substance data are extracted. The function generation section groups the 5 pieces $d_6$, $d_7$, . . . $d_{10}$ of substance data thus extracted into a second function Fn2. The function generation section 11 can generate functions by repeating the above process so that the number of pieces of substance data, included in each of the functions, is not more than the setting channel number. Accordingly, in FIG. 5, the pieces $d_1$, $d_2$, . . . $d_n$ of substance data are grouped into functions Fn1, Fn2, . . . , five by five in the order from the piece of substance data, having the earliest retention time, to the piece of substance data, having the latest retention time. In FIG. 5, each of the pieces $d_1$, $d_2$, . . . $d_n$ of substance data is shown such that a detection time range of each of these pieces of substance data is shown as a straight line extending along the time axis. In FIG. 5, all of the pieces of substance data are the same in length of detection time range. Further, each of the pieces of substance data has the retention time thereof in the middle of a detection time range thereof. For this reason, even if the sorting is carried out in accordance with the detection start times of the pieces of substance data, the result of the sorting would be the same as shown in FIG. 5.

On the other hand, in the case where the pieces of substance data are ordered in accordance with their retention times, and the detection time ranges of some neighboring pieces of substance data among the pieces of substance data do not overlap each other, a mutual relation ship between pieces of substance data (detection time ranges), belonging to each of the functions generated by the function generation section 11, would be as shown in FIG. 6. In FIG. 6, among the pieces of substance data, the piece $d_5$ of substance data has the fifth earliest retention time from that of the piece $d_1$ of substance data. Normally, the piece $d_5$ of substance data is supposed to be included in the first function Fn1 with the pieces $d_1$, $d_2$, . . . $d_4$. However, the detection time range of the piece $d_5$ and the detection time range of the piece $d_4$, which piece $d_4$ is located immediately before the piece $d_5$, do not overlap each other so that the piece $d_5$ is not included in the first function Fn1.

Therefore, the piece $d_5$ is grouped into the second function Fn2. The piece $d_5$ of substance data and the piece $d_6$ of substance data are grouped into different functions in the same manner as described above. The piece $d_6$ of substance data has the second earliest retention time from the retention time of the piece $d_5$. Normally, the piece $d_6$ of substance data is supposed to be included in the second function Fn2 to which the piece $d_5$ of substance data belongs. However, the detection time range of the piece $d_6$ of substance data and the detection time range of the piece $d_5$ of substance data, which piece $d_5$ of substance data is located immediately before the piece $d_6$ of substance data, do not overlap each other, so that the piece $d_6$ of substance data is not included in the function Fn2. Therefore, the piece $d_6$ of substance data is grouped into the third function Fn3. The piece $d_6$ of substance data and the piece $d_8$ of substance data are grouped into different functions in the same manner as described above. The piece $d_8$ has the third earliest retention time from the retention time of the piece $d_6$ of substance data. Normally, the piece $d_8$ of substance data is supposed to be included in the third function Fn3 to which the piece $d_6$ of substance data belongs. However, the detection time range of the piece $d_8$ of substance data and the detection time range of the piece $d_7$ of substance data, which piece $d_7$ of substance data is located immediately before the piece $d_8$ of substance data, do not overlap each other. Therefore, the piece $d_8$ of substance data is not grouped into the third function Fn3 but into the fourth function Fn4. In the present embodiment, the functions are generated so that the detection time ranges overlap each other as much as possible. For this reason, the pieces whose detection time ranges do not overlap each other are grouped into different functions, respectively. Note, however, that the function may include the pieces of substance data, having detection time ranges which do not overlap each other. In this case, how to group the pieces of substance data into functions can be determined by the user appropriately (for example, the user may set an acceptable interval between the detection time ranges which do not overlap each other, the acceptable number of pieces of substance data included in the function, which pieces do not have the detection time ranges that do not overlap each other, the acceptable number of functions each including the pieces whose detection time ranges do not overlap each other, etc.).

As described above, the function generation section 11 generates the functions so that each of the functions includes the pieces of substance data under the following conditions: (i) the number of the pieces of substance data, belonging to each of the functions, is not more than the setting channel number, and (ii) pieces of substance data, having detection time ranges which do not overlap each other, do not belong to the same function.

(Measurement Group Generation Section)

The measurement group generation section 12 is a module for grouping a plurality of functions generated by the function generation section 11 into measurement groups. As described above, each of the measurement groups is a group of functions, whose function ranges (measurement time regions) are not close to each other. That is, the measurement group generation section 12 groups the functions generated by the function generation section 11 into the measurement groups so that functions whose function ranges are close to each other belong to different measurement groups, respectively. Here, the function range of each of the functions is a time range from the earliest detection start time among the detection start times of the channels of the function to the latest detection end time among the detection end times of the channels of the function. Further, the description that "the function ranges are close to each other" means that a time interval F-F time between an end point of a function range (hereinafter, referred to as "function end time") to a start point of a following function range (hereinafter, referred to as "function start time") is less than a predetermined time interval (hereinafter, referred to as "setting gap"). Note that the setting gap is stored in the condition storage section 17 in advance, and the measurement generation section 12 can read out the setting gap from the condition storage section 17.

A function of the measurement generation section 12 can be realized by the following steps, for example. Each of the following steps is information processing carried out by the measurement group generation section 12 with respect to the table (array) stored in the main storage device (the main storage device 130, later described with reference to FIG. 14).

The following Steps 1 through 3 are carried out to set a function range of the pth function Fnp. Each of the functions is subjected to the following processes so that function ranges of all of the functions are set. When the function ranges (the function start time and the function end time) of all of the functions are set, a table (array) shown in (*d*) of FIG. 4 can be obtained.

In Step 1, for i whose function number a[i, 12] is p, a minimum value of the detection start time a[i, 4] is found, and the minimum value thus found is set as the function start time of the pth function Fnp.

In Step 2, for i whose function number a[i, 12] is p, a maximum value of the detection end time a[i, 5] is found, and the maximum value thus found is set as the function end time of the pth function Fnp.

In Step 3, for each i whose function number a[i, 12] is p, the function start time found in Step 1 is set as the function start time a[i, 14], and the function end time found in Step 2 is set as the function end time a[i, 15].

For each i whose function number a[i, 12] is 1, the measurement group number a[i, 13] is set to be 1, so that the first function Fn1 is grouped into a first measurement group In1. Then, for each p that is not less than 2, the following Step 4 is repeated, so that each function Fnp is grouped into one of the measurement groups. Upon the completion of the grouping of the functions, a table (array) shown in (*e*) of FIG. 4 can be obtained.

In Step 4, it is determined whether or not the function Fnp is close to the function which has been already grouped. Specifically, it is determined whether or not the difference F-F time between a maximum value of the functions end time in the measurement group In1 and the function start time of the function Fnp is not less than a predetermined threshold value. In a case where it is determined that the F-F time is not less than the threshold value, i.e. in a case where the function Fnp is determined as not being close to the function grouped into the measurement group In1, the function Fnp is grouped into the measurement group In1. That is, with respect to each i whose function number a[i, 12] is p, the measurement group number a[i, 13] is set to be 1. In a case where the difference F-F time between the maximum value of the functions end time in the measurement group In1 and the function start time of the function Fnp is less than a predetermined threshold value, i.e. in a case where the function Fnp is determined as being close to the function belonging to the measurement group In1, the above process is then carried out with respect to the function belonging to the measurement group In2. In a case where the function Fnp is determined as being close to the function belonging to the measurement group In2, the above process is then carried out with respect to the function belonging to the measurement group In3. This is repeated until the function belonging to a measurement group Inq, which function is not close to the function Fnp, is found (q<p). In a case where the measurement group Inq containing the function which is not close to the function Fnp is found, the function Fnp is grouped into the measurement group Inq. On the other hand, the function belonging to the measurement group Inq, which function is not close to the function Fnp, is not found, the function Fnp is grouped into a new measurement group (In(q+1)) independently.

As described above, the measurement group generation section 12 groups each of the functions into one of the measurement groups.

Figure 7:
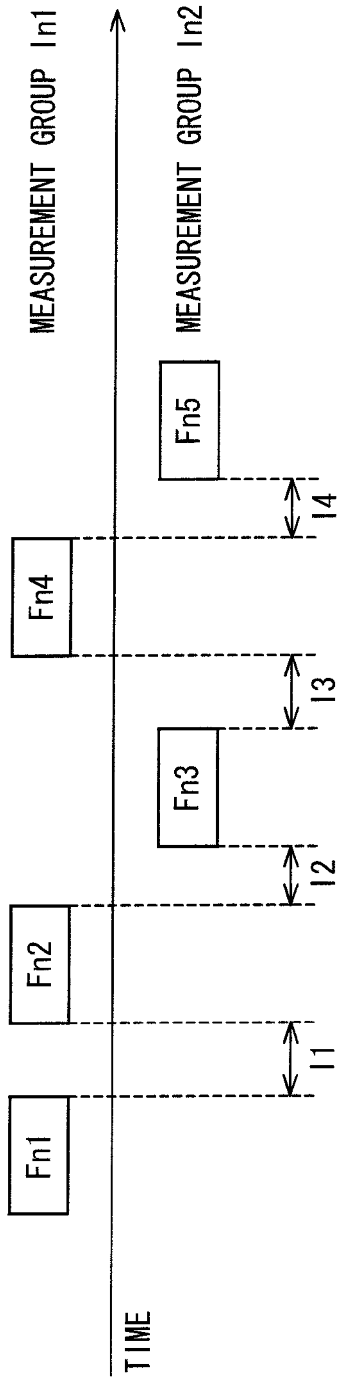
FIG. 7 is a view schematically illustrating a measurement group generated by the scheduling device in accordance with the embodiment of the present invention.

FIG. 7 is a view schematically illustrating an example in which 5 functions Fn1 through Fn5 are grouped into two measurement groups In1 and In2. In FIG. 7, the time axis is represented by a lateral axis, a function is schematically illustrated as a rectangular region, and a function range is represented by a lateral width of the rectangular region. Note that each of the functions shown in FIG. 7 is generated from a group of pieces of substance data, which are different from either the group of pieces of substance data from which the functions shown in FIG. 5 are generated, or the group of pieces of substance data from which the functions shown in FIG. 6 are generated. In FIG. 7, there is a gap between neighboring function ranges. However, this is for the sake of simple explanation, and the neighboring function ranges may overlap each other. For example, in FIG. 5, the detection time range of the piece $d_5$ of substance data and the detection time range of the piece $d_6$ of substance data overlap each other, so that the function Fn1 and the function Fn2 overlap each other.

In FIG. 7, I1 through I4 represent the gaps between the functions, respectively. Here, I1=0.20 min, I2=0.19 min, I3=0.20 min, and I4=0.19 min. Further, the setting gap is set to be 0.20 min by the user. Since the value of I1 is equal to the setting gap (not less than the setting gap), the functions Fn1 and Fn2 are grouped into the same measurement group In1. On the other hand, since the value of I2 is less than the setting gap, the function Fn3 is grouped into the measurement group In2 which is different from the measurement group In1 including the function Fn2. The value of I3 between the functions Fn4 and Fn3 is 0.20 min, which is not less than the setting gap. Meanwhile, the gap between the functions Fn4 and Fn2 is also not less than the setting gap. In the present embodiment, in a case where there is a plurality of measurement groups into any of which a function can be grouped, the function is grouped into a measurement group having a smaller measurement group number. For this reason, the function Fn4 is grouped into the measurement group In1. The value of I4 between the functions Fn4 and Fn5 is 0.19 min, which is less than the setting gap. For this reason, the function Fn5 is grouped into the measurement group that is different from the measurement group In1 including the function Fn4. Here, the gap between the functions Fn3 and Fn5 is not less than 0.20 min. Therefore, the function Fn5 is grouped into the measurement group In2 including the function Fn3.

In the present embodiment, the functions are grouped into the two measurement groups. Note, however, that three or more measurement groups may be generated in accordance with a value of the setting gap. For example, in a case where the function range of the function Fn2 is 0.3 min, and the setting gap is 0.8 min, the functions Fn1, Fn2, and Fn3 are grouped into three measurement groups different from each other, respectively.

(Function Range Extension Section)

The function range extension section 13 is a module for re-setting the function start time and the function end time of each of the functions under a condition where neighboring function ranges in the same measurement group do not overlap each other. This can add, to each of the functions, a part of the gap between the neighboring functions in the same measurement group, so as to extend the function range of each of the function. The mass spectrometer 300 can designate a channel corresponding to a target mass number in the extended function range. In the present embodiment, the mass spectrometer 300 can detect a substance even during a period of time which originally served as the gap between the functions. Therefore, in the present embodiment, the mass spectrometer 300 can detect the substance more successfully even if the retention time of the substance is shifted from the value of information on the retention time, included in a corresponding piece of substance data, as a result of the actual separation carried out by the liquid chromatograph 200. In the same manner, the mass spectrometer 300 can detect the substance more successfully, even if the amount of the substance included in the sample is large and the detection end time of the substance is delayed from the value of the information on the detection end time, included in the corresponding piece of substance data, as a result of the actual separation carried out by the liquid chromatograph 200.

Figure 8:
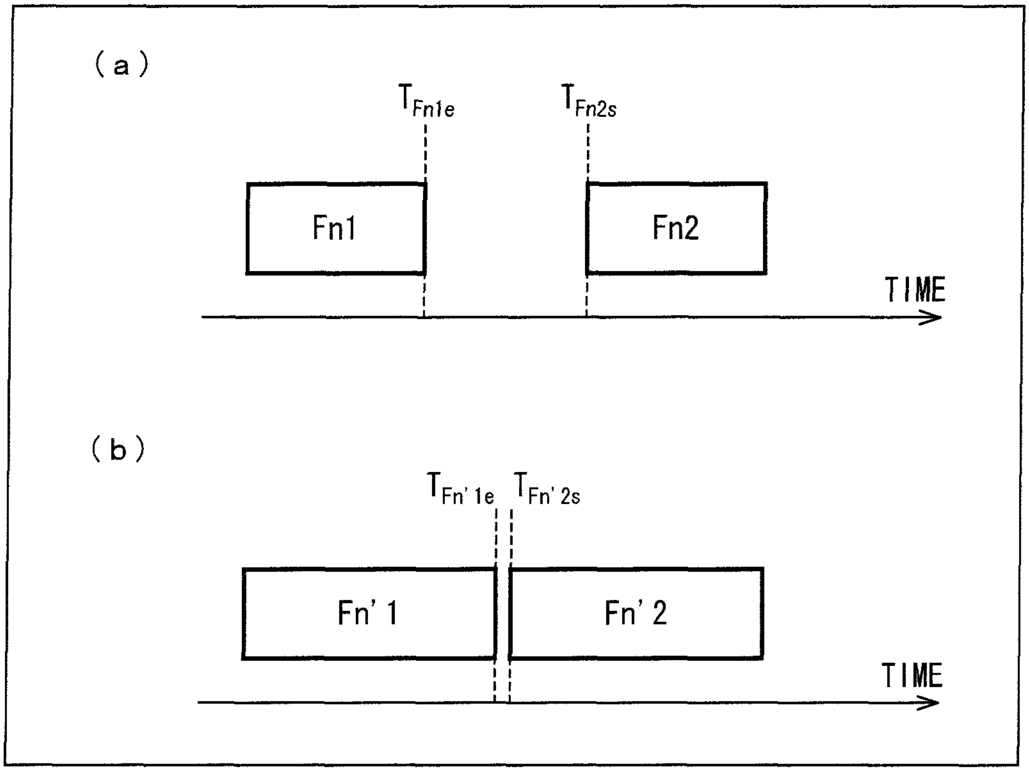
FIG. 8 is a view schematically illustrating how function ranges are extended by the scheduling device in accordance with the embodiment of the present invention.
Figure 9:
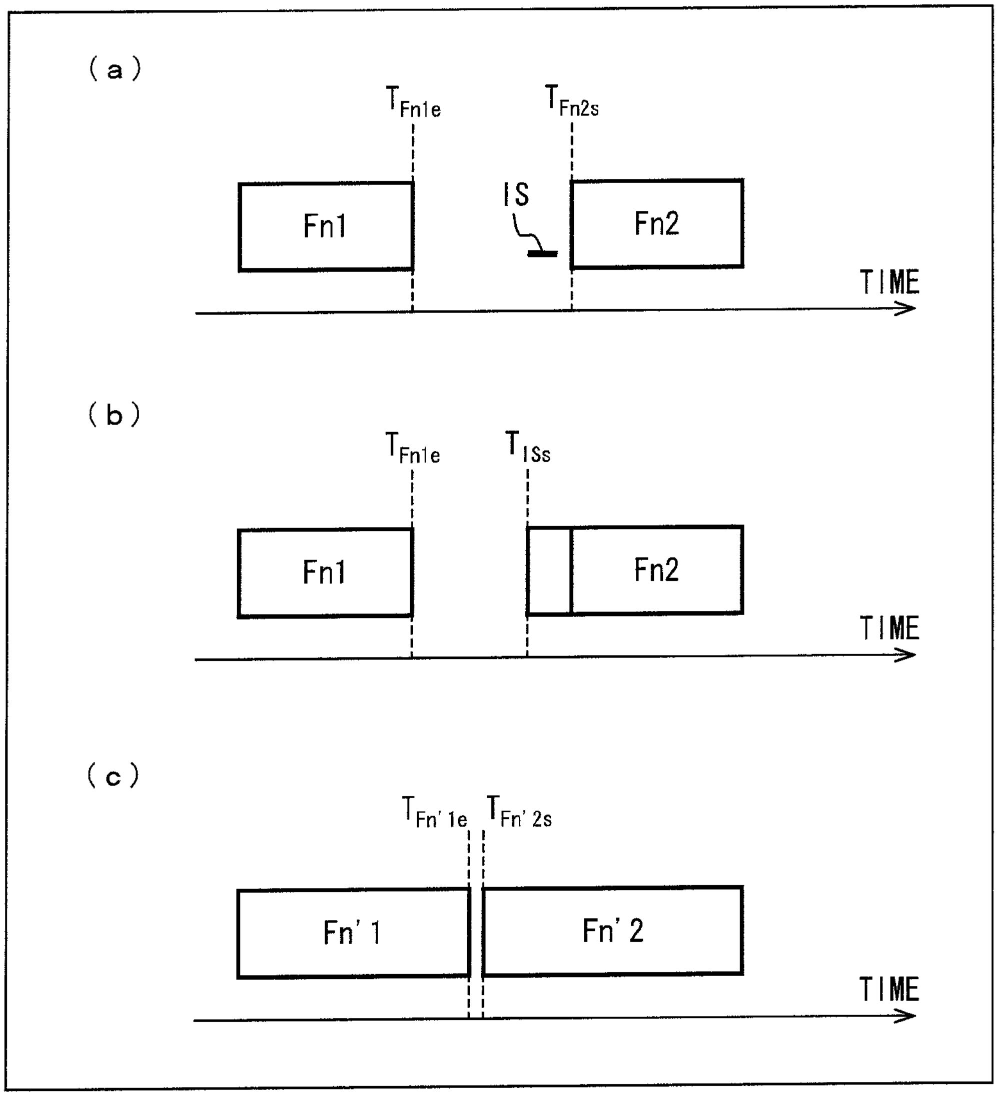
FIG. 9 is another view schematically illustrating how function ranges are extended by the scheduling device in accordance with the embodiment of the present invention.

Each of FIGS. 8 and 9 schematically illustrates an example showing how a function range is extended by the function range extension section 13. Either in FIG. 8 or in FIG. 9, each of the functions is schematically illustrated as a rectangular region. Further, a period of time of a function range is indicated by a width of the rectangular region. (*a*) of FIG. 8 illustrates two functions Fn1 and Fn2 which are adjacent to each other in the same measurement group, and (*b*) of FIG. 8 illustrates functions Fn'1 and Fn'2 which are obtained in such a manner that function ranges of the functions Fn1 and Fn2 are extended. The function range extension section 13 extracts a start time $T_{Fn2s}$ which is a start point of the function Fn2, and an end time $T_{Fn1e}$ which is an end point of the function Fn1 (see (a) of FIG. 8). The function range extension section 13 sets an end time $T_{Fn'1e}$ which is an end point of the function Fn'1, as $T_{Fn'1e}=(T_{Fn2s}-T_{Fn1e})/2$ (see (*b*) of FIG. 8). Further, the function range extension section 13 sets a start time $T_{Fn'2s}$ which is a start point of the function Fn'2, as $T_{Fn'2s}=((T_{Fn2s}-T_{Fn1e})/2)+0.01$ (see (*b*) of FIG. 8). Here, the gap (0.01 min) between the functions Fn'1 and Fn'2 is an overhead period of time for removal of ions when the measurement is switched over from a certain function to the next function. Note that the overhead period of time is not limited to 0.01 min. The function range extension section 13 sets, for each of the measurement groups, a new start time of a function to be "0", which function has the earliest function start time among functions in that measurement group. Further, the function range extension section 13 sets, for each of the measurement groups, a new end time of a function to be extended up to a maximum end time acceptable in the measurement, which function has the latest function start time among the functions in that measurement group.

On the basis of information on the extended function range of the function, the function range extension section 13 rewrites, for each of the functions, the function start time and the function end time stored on the table (array) shown in (*e*) of FIG. 4, so as to set the function start time and the function end time again. Thus, a table (array) shown in (*f*) of FIG. 4 can be obtained.

With the processes described above, it is possible to obtain the table in which (i) each of pieces of substance data, including channel information, (ii) a function number, (iii) a measurement group number, and (iv) information on a function range (a function start time, a function end time) are associated with each other. The channel information indicates the followings: (1) a substance ID, (2) a substance name, (3) a retention time, (4) a detection start time, (5) a detection end time, (6) a dwell time, (7) an ionization mode, (8) a mass number of a precursor ion, (9) a mass number of a product ion, (10) a cone voltage (CV), and (11) collision energy (CE).

Note that in a case where the detection of a substance is carried out by use of the mass spectrometry system 1, an internal standard substance (hereinafter, referred to as "IS") can be contained in a sample. The IS is used to determine, for each of the measurement groups, whether or not the measurement is appropriately carried out. For the purpose of the determination, a certain amount of the IS is added to the sample in advance. By detecting the IS thus added, it is possible to find an analysis error. Further, the IS is also used to determine an amount of each of other analytes contained in the sample. For the purpose of the determination, the amount of the IS in the sample is detected and used as a standard. In the present invention, (1) the measurement group generation section 12 groups the functions into the measurement groups, then (2) a process for causing a function to include substance data of the IS is carried out, which function has a function range that is closest to a retention time of the IS along the time axis, after that (3) the function range extension section 13 extends the function range. FIG. 9 is a view schematically illustrating how the function range is extended in a case where the IS is used.

(*a*) of FIG. 9 shows positions of the functions and a detection time range of the IS along the time axis. Note that in FIG. 9, the function Fn2 has the function range that is closest to the retention time of the IS along the time axis. In this case, the function range extension section 13 adds the substance data of the IS to the function Fn2 before setting the function Fn'2. In FIG. 9, the retention time of the IS is located earlier than the start time (function start time) $T_{Fn2s}$ of the function Fn2. Therefore, due to the addition of the IS to the function Fn2, the function range extension section 13 sets the functions Fn'1 and Fn'2 by use of a start time $T_{ISs}$ of the IS in place of the start time $T_{Fn2s}$ of the function Fn2 (see (*b*) of FIG. 9). In other words, the function range extension section 13 sets the end time (function end time) $T_{Fn'1e}$ of the function Fn'1 as $T_{Fn'1e}=(T_{ISs}-T_{Fn1e})/2$, and sets the start time $T_{Fn'2s}$ of the function Fn'2 as $T_{Fn'2s}=((T_{ISs}-T_{Fn1e})/2)+0.01$ (see (*c*) of FIG. 9). Note here that the start time of the IS is a time when detection of a peak of the IS is started in the liquid chromatograph 200, and the end time is a time when the detection of the peak of the IS is finished in the liquid chromatograph 200. That is, the start time and the end time of the IS are the detection start time and the detection end time of the IS, respectively.

(Output Data Generation Section)

The output data generation section 14 is a module for generating output data in which the channels, the functions, and the measurement groups are associated with each other. The output data is transmitted to the mass spectrometer 300 and the liquid chromatograph 200. Alternatively, the output data generation section 14 can convert data of the table into a video signal, and then supply the video signal to an output device such as a monitor, via which the user can view the output data. FIG. 10 is a view showing an example of the output data generated by the output data generation section 14. In the example shown in FIG. 10, each row indicates information on a channel and information on a measurement group thus scheduled. As shown in FIG. 10, in the output data, each of the channels used in the measurement by the mass spectrometer 300 is associated with a corresponding function and a corresponding measurement group. The scheduling device 100 outputs the output data to the mass spectrometer 300. The mass spectrometer 300 sets the conditions by use of the output data received from the scheduling device 100 as the measurement schedule, and carried out mass spectrometry analysis with respect to the sample which passes through the liquid chromatograph 200 and enters the mass spectrometer 300. FIG. 11 is a view showing the output data outputted on a screen of a monitor. In FIG. 11, only one function in a certain measurement group is shown. Here, as an example, the information of the output data, generated by the output data generation section 14, is introduced into a control application of the mass spectrometer 300.

The scheduling device 100 controls the liquid chromatograph 200 so that the number of the measurement groups is equal to the number of times the introduction of the sample into the liquid chromatograph 200 is carried out.

Here, the following description explains how the mass spectrometer 300 is controlled by use of the output data.

The mass spectrometer 300 receives the output data from the scheduling device 100 via the data reception section 310, and then transmits the output data thus received to the control section 320. The control section 320 identifies each of the pieces of substance data belonging to each of the measurement groups by looking up the following information included in the output data: (i) the measurement group number information, (ii) the function number information, (iii) the channel information, and (iv) the substance ID information. The control section 320 looks up, for each of the measurement groups, a function range of each of the functions, so as to control, in accordance with the function range of that function, the ionization device 330, the mass separation device 340, and the ion detection device 350.

How the control section 320 controls the mass separation device 340 is specifically described below. The control section 320 looks up the function range information of each of the functions, cone voltage information of the substances belonging to that function, and collision energy information of the substances belonging to that function, so as to determine which cone voltage and which collision energy should be set by the mass separation device 340 for each of the function ranges in the measurement group. Based on the determination, the control section controls the mass separation device 340 to set a certain cone voltage and certain collision energy per function. Due to the control by the control section 320, the mass separation device 340 causes the substances belonging to a certain function to be subjected to the mass separation with the certain cone voltage and the certain collision energy thus set.

How the control section 320 controls the ion detection device 350 is specifically described below. On the basis of the information on each of the function ranges and the channel information of the substances belonging to the function, the control section 320 determines, per measurement group, which ion should be detected by the ion detection device 350 based on the mass number. In a case where the function includes a plurality of channels, the control section 320 controls the ion detection device 350 to detect a plurality of mass numbers in the corresponding function. Due to the control by the control section 320, the ion detection device 350 carries out the detection of the ion. The information on the ion thus detected is transmitted to the detection data processing section 360.

Figure 12:
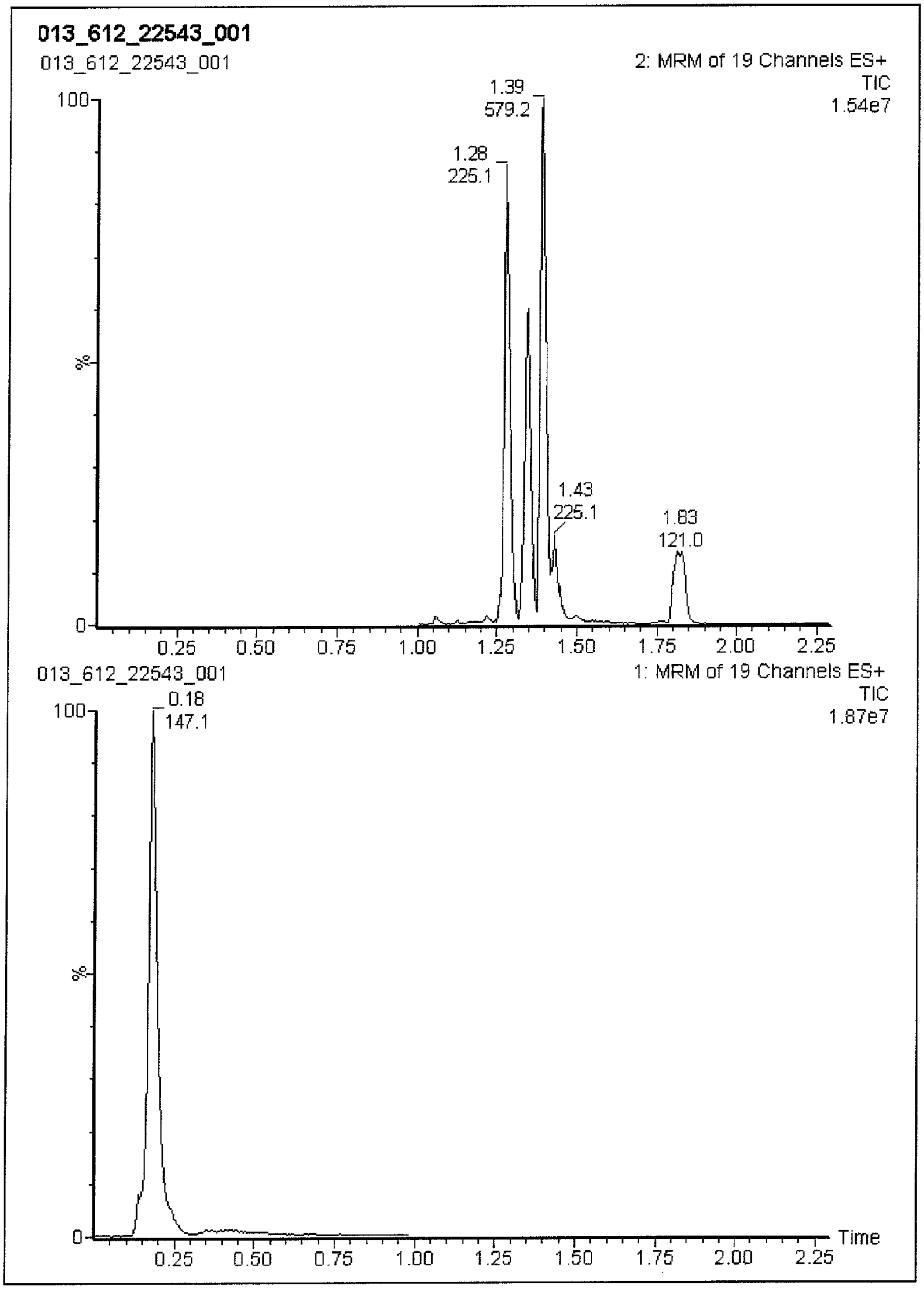
FIG. 12 is a view showing a result of analysis carried out by a mass spectrometer in accordance with the embodiment of the present invention.

As described above, the detection data processing section 360 converts the information on the ion, received from the ion detection device 350, into the mass spectrum information. The mass spectrum information can be presented to the user by use of output means such as a monitor or a printer. The monitor may be directly connected to the mass spectrometer 300. Alternatively, the monitor may be connected to the scheduling device 100. In a case where mass chromatography data is displayed on the monitor of the scheduling device 100, the detection data processing section 360 supplies data for causing the mass chromatography data to be displayed, to the scheduling device 100. FIG. 12 is a view illustrating an example of an analysis result displayed on the screen of the monitor.

In the present embodiment, the detection data processing section 360 causes the monitor to display the analysis result per measurement group. Further, the detection data processing section 360 causes the monitor to display, on the same window, results corresponding to the respective functions belonging to the same measurement group. FIG. 12 shows the analysis result with respect to a certain measurement group constituted by two functions. In FIG. 12, lower mass chromatography data corresponds to a function which has been subjected to the detection process earlier than the other function among the two functions. Meanwhile, in FIG. 12, upper mass chromatography data corresponds to the other function (the function which has been subjected to the detection process later than the above function). In FIG. 12, the analysis result is shown in such a manner that the time axis is indicated by a lateral axis, and a value relative to ion strength is indicated by a vertical axis (for each function, ion strength of a mass number whose total number of ions is largest in that function is assumed to be 100 ion strength). As shown in FIG. 12, time ranges occupied by the detected ions along the time axis are differently provided between different functions. That is, in the example shown in FIG. 12, at the lower mass chromatography data, the detected target ion is positioned earlier along the time axis, on the other hand, at the upper mass chromatography data, the detected target ions are positioned later along the time axis. The detection is thus managed so that it becomes possible that two functions included in a measurement group have function ranges which are different from each other, and therefore simultaneously multiple channels included in each of the two functions can be detected simultaneously.

(Condition Reception Section and Condition Storage Section)

The condition reception section 15 is a module for receiving each condition inputted by the user via input means 19 in a case where the user sets the aforementioned conditions for generating functions and measurement groups. The information on the conditions, received by the condition reception section 15, is stored in the condition storage section 17.

The condition storage section 17 is a storage section for storing the conditions which are to be looked up by the function generation section 11 and the measurement group generation section 12. The information on these conditions may be received by the condition reception section 15 from the user, or may be stored in the condition storage section 17 in advance.

Figure 13:
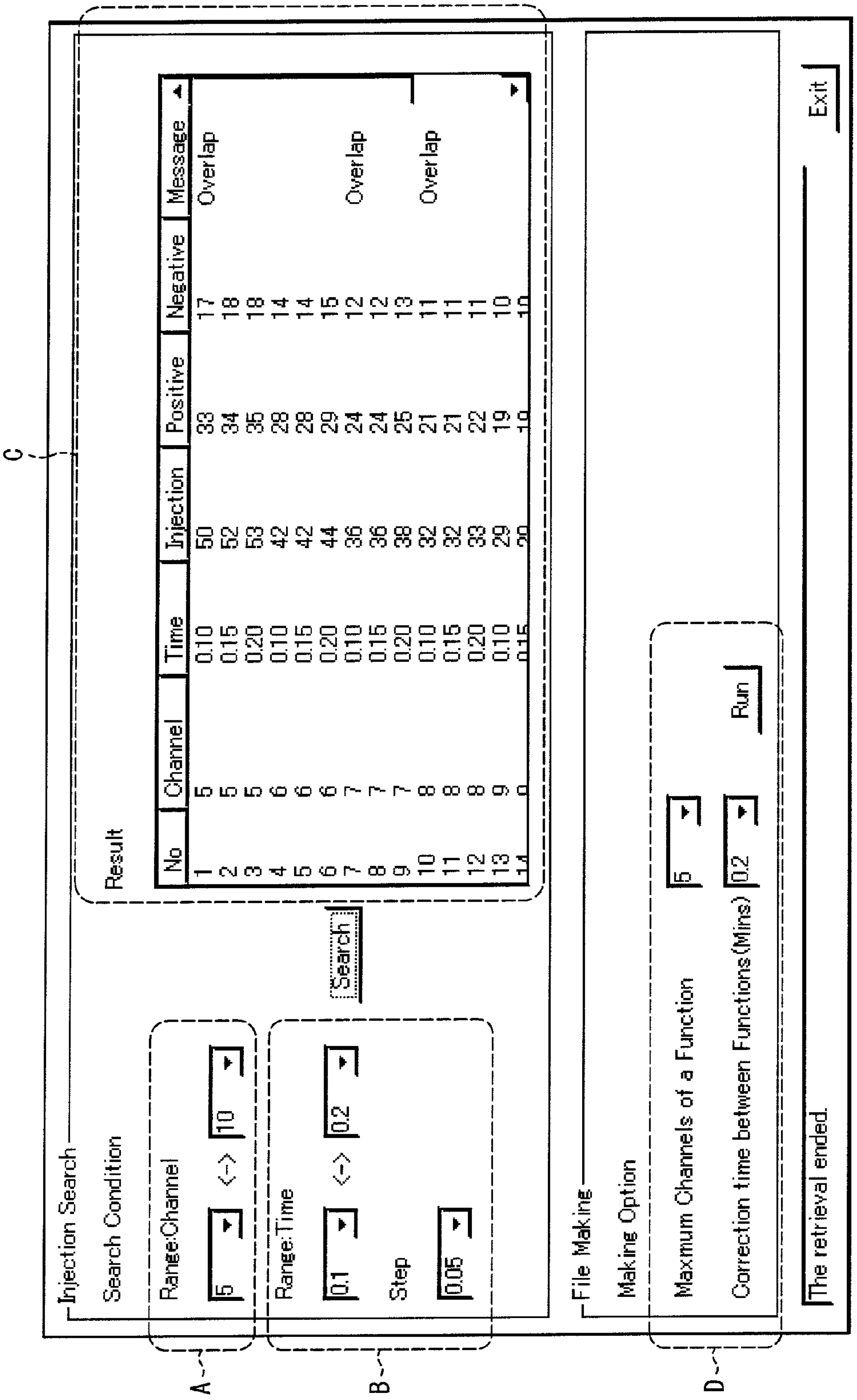
FIG. 13 is a view illustrating an input screen in accordance with the embodiment of the present invention.

In the above embodiment, either the setting channel number or the setting gap is set as a single value. However, the present invention is not limited to this. For example, (i) the user can input a plurality of setting channel numbers, and a plurality of setting gaps, (ii) the function generation section 11 can generate a plurality of patterns of functions by use of the respective plurality of setting channel numbers, and (iii) the measurement group generation section 12 can generate a plurality of patterns of measurement groups by use of the respective plurality of setting gaps. FIG. 13 is a view illustrating the screen of the monitor, which displays (i) input display parts via which the user can input the plurality of setting channel numbers and the plurality of setting gaps, and (ii) the result of the scheduling. Note that in a case where the user inputs a plurality of values, for example, "5, 6, 7, 8, 9, and 10", as the setting channel numbers, the user can input "5" as a minimum value and "10" as a maximum value. Thus, the user can input the maximum and minimum values of the setting channel numbers via an input display part (the part surrounded by a dotted frame A in FIG. 13). In the same manner, in a case where the user would like to input "0.10, 0.15, and 0.20" as the setting gaps, for example, the user can input "0.10" as the minimum value, "0.20" as the maximum value, and "0.05" as an increment step. Thus, the user can input the minimum and maximum values of the setting gaps and the increment step into an input display part (the part surrounded by a dotted frame B in FIG. 13).

In a case where a plurality of values are inputted as the setting channel numbers, the function generation section 11 carries out the above processes with respect to each of the setting channel numbers thus inputted. Further, in a case where a plurality of setting gaps are inputted, the measurement group generation section 12 carries out the above processes with respect to each of the setting gaps thus inputted. Therefore, in a case x setting channels and y setting gaps are inputted, the output data generation section ultimately generates (x×y) pieces of output data. The (x×y) pieces of output data is constituted by a huge number of patterns obtained in accordance with the measurement group number (i.e. the number of times necessary to carry out the introduction of the sample), the number of channels set per function, the function range of each of the functions, a combination of pieces of substance data belonging to each of the functions, and a combination of pieces of substance data belonging to each of the measurement groups. These patterns may include patterns identical with each other. The user can determine which measurement schedule is to be used by taking into consideration, among the plurality of pieces of output data, (i) a preparable amount of the sample, (ii) the number of target substances of the measurement, (iii) demanded detection sensitivity and accuracy, (iv) cost and period of time available, (v) performance of the mass spectrometer (how many mass numbers are detectable at the same time, i.e. how many channels can be designated), etc. The scheduling device 100 causes a result display part (the part surrounded by a dotted frame C in FIG. 13) to display the output data indicating only limited information, such as the number of pieces of substance data per function, the setting gap, the number of measurement groups, etc. Note that it is necessary to introduce the sample as many times as the number of measurement groups, so that the result display part surrounded by the dotted line C in FIG. 13 displays the number of measurement groups as a required number of times that the injection is carried out (sample introduction). The user can select the measurement schedule to be used in the actual mass spectrometry analysis while referring to the information displayed on the result display part.

The scheduling device 100 receives, via the selection reception section 18, a result of the selection from the user, which result is inputted via the input means 19. Then, the scheduling device 100 supplies the information thus received to the output data generation section 14. On the basis of the information received from the selection reception section 18, the output data generation section 14 transmits the output data selected by the user to the mass spectrometer 300. For the reception of the input from the user, it is possible for the user to input the number of channels to be selected and the setting gap to an input display part (the part surrounded by a dotted frame D in FIG. 13).

(Example of Configuration by Use of Computer)

Figure 14:
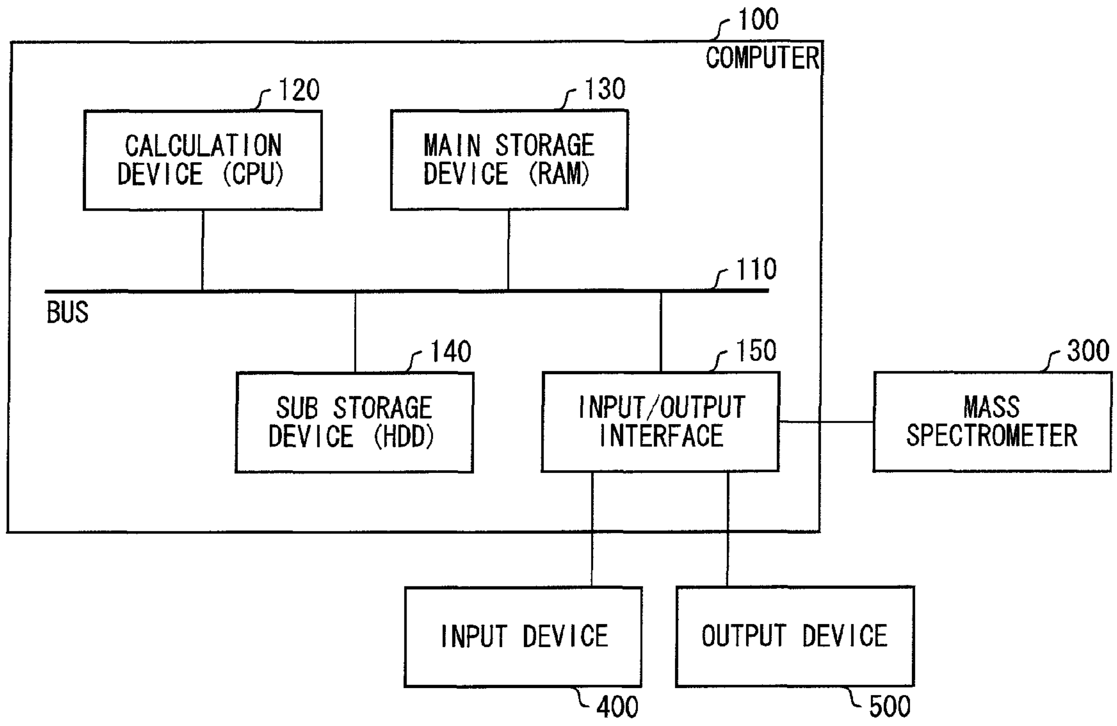
FIG. 14 is a block diagram illustrating how hardware of a scheduling device in accordance with the embodiment of the present invention is arranged, which scheduling device is realized by use of a computer.

The scheduling device 100 can be realized, for example, by use of a computer (electronic calculator). FIG. 14 is a block diagram illustrating an example of a hardware configuration of the scheduling device 100, realized by use of a computer.

The scheduling device 100 includes a calculation device 120, the main storage device 130, a sub storage device 140, and an input/output interface 150, all of which are connected to each other via a bus 110 (see FIG. 14). The calculation device 120 may be a CPU (central processing unit). Further, the main storage device 130 may be a semiconductor RAM (random access memory), for example. Moreover, the sub storage device 140 may be a hard disk drive, for example.

The input/output interface 150 is connected to the mass spectrometer 300, an input device 400, and an output device 500 (see FIG. 14). An interface between the input/output interface 150 and the mass spectrometer 300 can be realized by a USB (Universal Serial Bus), a communication network, or the like, for example.

The input device 400 is means via which the scheduling device 100 receives an input from the user, such as the setting channel number or the setting gap. The input device 400 may be a keyboard, for example. An interface between the input/output interface 150 and the keyboard is generally the USB or the like. Each condition value inputted via the input device 400 is stored in the main storage device 130 so that the calculation device 120 can look up such a condition value. That is, the main storage device 130 is used as the condition storage section 17. On the other hand, the output device 500 is means for outputting the output data. The output device 500 may be a monitor, for example. An interface between the input/output interface 150 and the monitor is generally a DVI (Digital Visual Interface), for example. Note that it is possible to store the output data in the sub storage device 140, instead of outputting the output data via the output device 500.

In the sub storage device 140, various programs for causing a computer to function as the scheduling device 100 is stored. Specifically, in the sub storage device 140, the following programs are stored: a function generation program for causing the computer to function as the function generation section 11; a measurement group generation program for causing the computer to function as the measurement group generation section 12; a function range extension program for causing the computer to function as the function range extension section 13; an output data generation program for causing the computer to function as the output data generation section 14; a condition reception program for causing the computer to function as the condition reception section 15; and a selection reception program for causing the computer to function as the selection reception section 18.

It is possible to cause the computer to function as the function generation section 11 by causing the calculation device 120 to execute a command included in the function generation program which is developed on the main storage device 130 and loaded by an instruction cache. In the same manner as causing the computer to function as the function generation section 11, it is possible to cause the computer to function as each of the measurement group generation section 12, the function range extension section 13, the output data generation section 14, the condition reception section 15, and the selection reception section 18 by causing the calculation device 120 to execute the command included in each of the measurement generation program, the function range extension program, the output data generation program, the condition reception program, and the selection reception program.

Further, in the sub storage section 140, a database program for causing the computer to function as a database module, and a substance data file which is looked up by the database module are stored. In the same manner as causing the computer to function as the function generation section 11, it is possible to cause the computer to function as the database module by causing the calculation device 120 to execute a command included in the database program. The substance data file is a file in which substance data concerning a plurality of substances is stored. In response to a request from the function generation section 11, the database module reads out the substance data stored in the substance data file or write substance data on the substance data file. The substance data storage section 16 illustrated in FIG. 2 can be realized by a combination of such a substance data file and such a data base module.

An object of the present invention can be achieved by (i) supplying, to the scheduling device 100, a storage medium in which a program code of each of the aforementioned programs (executable format program, intermediate code program, source program) is stored in a computer-readable manner, and (ii) causing the scheduling device 100 to read out and execute the program code stored in the storage medium.

Examples of the storage medium include: tapes, such as a magnetic tape and a cassette tape; disks including a magnetic disk, such as a floppy disk (registered trademark) or a hard disk, and an optical disk, such as a CD-ROM, a magnetic optical disk (MO), a mini disk (MD), a digital versatile disk (DVD), or a CD-R; cards, such as an IC card (including a memory card) and an optical card; and semiconductor memories, such as a mask ROM, an EPROM, an EEPROM, and a flash ROM.

Further, it is possible that (i) the scheduling device 100 is arranged so as to be connectable with a communication network, and (ii) the program code is supplied to the scheduling device 100 via the communication network. The communication network is not particularly limited. Specific examples of the communication network include Internet, intranet, extranet, LAN, ISDN, VAN, a CATV communication network, a virtual private network, a telephone line network, a mobile communication network, a satellite communication network, and the like. Furthermore, a transmission medium constituting the communication network is not particularly limited. Specifically, it is possible to use a wired line such as a line in compliance with IEEE 1394 standard, a USB line, a power line, a cable TV line, a telephone line, an ADSL line, or the like, as the transmission medium. Further, it is possible to use (i) a wireless line utilizing an infrared ray used in IrDA and a remote controller, (ii) a wireless line which is in compliance with Bluetooth standard (registered trademark) or IEEE802.11 wireless standard, and (iii) a wireless line utilizing HDR, a mobile phone network, a satellite line, a ground wave digital network, or the like, as the transmission medium. Note that, the present invention can be realized by a computer data signal which is realized by electronic transmission of the program code and which is embedded in a carrier wave.

Embodiment 2

Another embodiment of the present invention is described below. Note that for the sake of simple explanation, members having the same functions as those described in Embodiment 1 have the same signs, and explanations thereof are omitted here.

In Embodiment 1, the function generation section 11 groups pieces of substance data into functions by use of a condition, which is a value (setting channel number) determining how many channels can be included in each of the functions. In the present embodiment, the condition is a value (second specified value, function setting width) determining a time width of a function range of each of the functions. Further, in the present embodiment, each of the pieces of substance data includes information on the shortest detection period of time, which is defined by a dwell time necessary for the measurement.

The function generation section 11 extracts pieces of substance data, and sorts out the pieces of substance data along a time axis on the basis of retention times, included in the respective pieces of substance data. The function generation section 11 obtains, from the condition storage section 17, information on a function setting width, which is a condition for generating functions. The function generation section 11 accumulates the shortest detection periods of time, included in the respective pieces of substance data, in an order from the first piece to the last piece in the order resulting from the sorting. The function generation section 11 groups pieces of substance data into the first function as accumulating the shortest detection periods of time. At timing that an addition of a shortest detection period of time causes a sum of the shortest detection periods of time to exceed the function setting width, the function generation section 11 groups, into the second function, a piece of substance data including that shortest detection period of time. Then, the function generation section 11 groups pieces of substance data into the second function, as accumulating the shortest detection periods of time of these pieces of substance data, until an addition of a shortest detection period of time causes the sum to exceed the function setting width. By repeating this process, a function including the pieces of substance data, which pieces are successively arrayed in the order, is generated in turn. Note that the function generation section 11 groups pieces of substance data, which pieces have substance detection time ranges which do not overlap each other along the time axis, into functions different from each other, as in Embodiment 1.

As the number of sorts of target substance to be measured increases and the number of channels included in a function increases, the dwell time generally decreases. As a result, the detection sensitivity decreases. Accordingly, in a case where an amount of a substance in a sample is very small, and is almost equal to or less than a minimum detectable value, it is preferable to decrease the number of substances to be measured within the same time range, i.e. the number of channels to be set. This increases the dwell time so that the detection sensitivity increases. According to the present embodiment, in a case where a piece of substance data, whose shortest detection period is long, is included in a function, the number of pieces of substance data, included in the function, decreases. This causes the dwell time to be longer in the function, so that the measurement can be carried out with high detection sensitivity. Meanwhile, in a case where the amount of the substance in the sample is large and therefore the substance can be properly detected even with low detection sensitivity, it is possible to cause the function to include a large number of pieces of substance data by setting the shortest detection period to be shorter. This allows detection of a large number of substances within the function, so that a total measurement period can be reduced. Further, in a case where the amount of the substance in the sample is assumed to be larger than a maximum detectable value, it is preferable to increase the number of pieces of substance data, included in the function, by setting the shortest detection period to be shorter. By decreasing the detection sensitivity, it becomes possible to cause the amount of substance to be less than the maximum detectable value.

Embodiment 3

Figure 15:
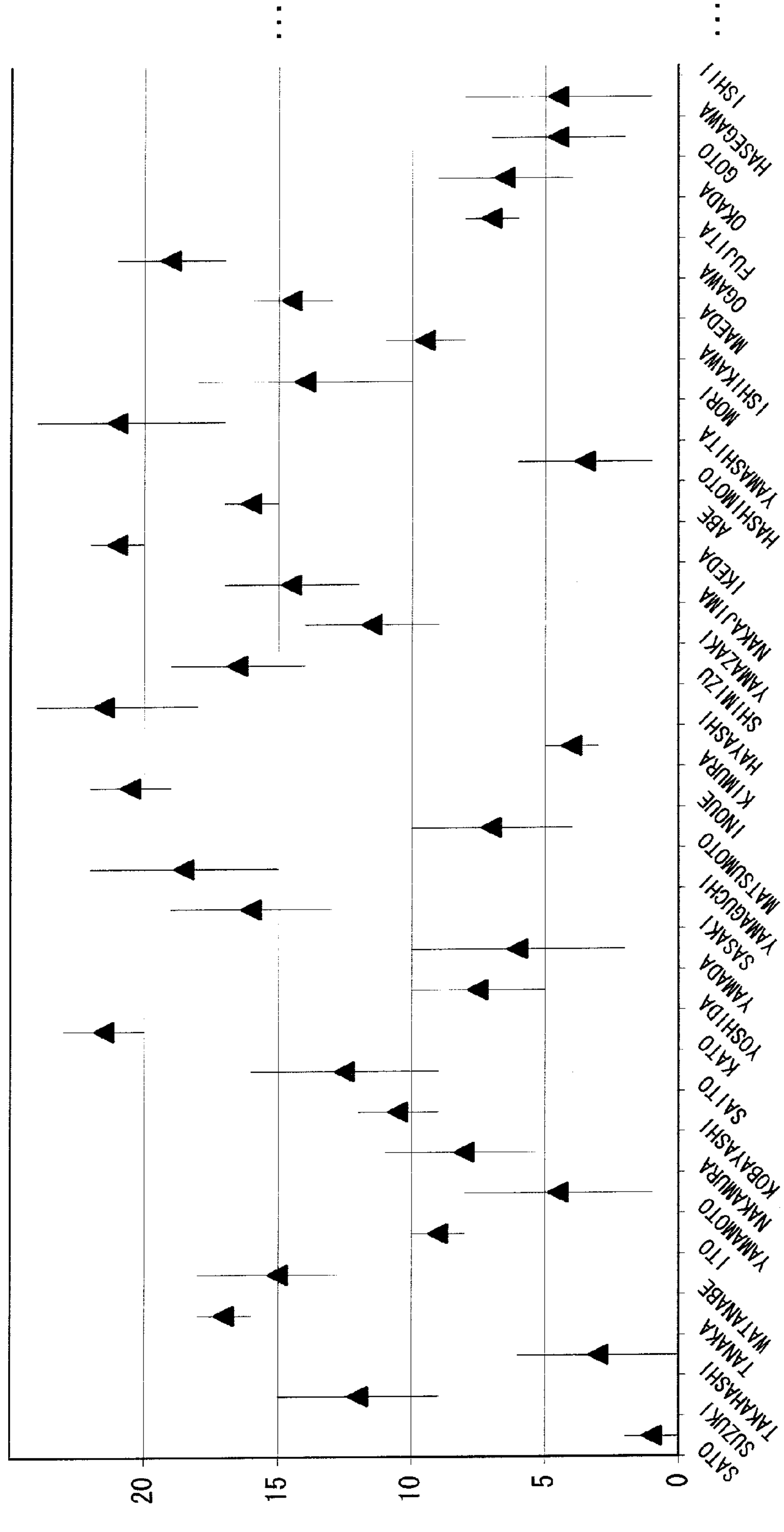
FIG. 15 is a view schematically illustrating desired shift time ranges included in data, in accordance with another embodiment of the present invention.

Still another embodiment of the present invention is described below with reference to FIGS. 15 and 16. Note that for the sake of simple explanation, members having the same functions as in the above embodiments have the same signs, and explanations thereof are omitted here.

The embodiments described above deal with scheduling for a measurement schedule in a mass spectrometry system for detecting a substance by measuring a mass number of the substance in a sample. However, the present invention is not limited to this. The present embodiment deals with management of shifts of part-timers, non-regular workers, and the like.

The present embodiment is made on a premise that 100 part-timers are employed for a store, and their desired shifts are different from each other. A scheduling device of the present embodiment automatically manages shifts of 100 part-timers (process execution schedule). That is, the scheduling device automatically manages which time range on which business day each of the pert-timers should work.

In the present embodiment, target data to be processed by the scheduling device is personnel data (process target data) including information on each of the part-timers. Each of pieces of personnel data includes information indicating (1) an employee ID for identifying the part-timer from the other part-timers, (2) a name of the part timer, (3) a start time (process execution time) of a desired shift (working hours desired by that part-timer), and (4) an end time (process execution time) of a desired shift (working hours desired by that part-timer). Note that each of the pieces of personnel data may include a time corresponding to an intermediate value between the start time and the end time of the desired shift. Each of the desired shifts is a period of time arbitrarily selected from a time range of 0:00 to 23:00. Each of the pieces of personnel data is inputted into the scheduling device in advance. Note here that in the present embodiment, (i) each of the desired shifts indicates a time range during which the part-timer wish to work at least, and (ii) the part-timer accepts a shift longer than the desired shift as long as the shift and the entire desired shift overlap each other. FIG. 15 is a view partially illustrating a chart in which a desired shift of each of the part-timers is shown as a straight line along a time axis. In FIG. 15, a vertical line (with numbers) represents the time axis. As shown in FIG. 15, a variety of shifts (start times and end times) of are desired by the part-timers.

For the management of the shifts of the part-timers, a manager, such as a store manager of the store, sets the following (i) and (ii) to be 1 or more, and inputs them into the scheduling device: (i) the number of part-timers who work in the same time range (hereinafter, referred to as "the number of workers on duty") (second specified value), and (ii) an interval between the shifts (first specified value). The following description deals how the scheduling device carries out the scheduling by looking up the personnel data, the number of workers on duty, and the interval between the shifts, each of which has been inputted into the scheduling device.

In Step 1, the scheduling device looks up the information on the desired shifts included in the personnel data, and sorts out pieces of personnel data in accordance with the desired shifts, which pieces of personnel data correspond to the respective part-timers. Note that the information on the desired shift is a start time of the desired shift.

In Step 2, the scheduling device looks up the number of workers on duty, and groups, into data groups, the pieces of personnel data in turn, in an order from the earliest desired shift to the latest desired shift so that the number of pieces of personnel data, included in each of the data groups, is equal to the number of workers on duty. Unlike the embodiments described above, in the present embodiment, even if two pieces of personnel data (corresponding to two part-timers) are successively arrayed in an order resulting from the sorting, and have desired shift ranges which do not overlap each other, the scheduling device groups the two pieces into the same group as long as the number of pieces of personnel data, included in the data group (first data group: corresponding to "function" in the above embodiments) thus generated, is less than the number of workers on duty thus inputted. Note that the desired shift range is a range from the start time to the end time of the desired shift.

In Step 3, the scheduling device finds, among the desired shifts included in the pieces of personnel data included in each data group, the earliest desired shift start time and the latest desired shift end time, and sets a range between the earliest desired shift start time and the latest desired shift end time as a shift time range (process execution time range).

In Step 4, the scheduling device further groups the data groups, which have been generated in accordance with the number of workers on duty. This grouping assigns the data groups, which have been generated in accordance with the number of workers on duty, to business days (second data group: corresponding to "measurement group" in the above embodiments). Here, the scheduling device assigns each of the data groups to one of the business days so that an interval between the shift time ranges of the data groups, belonging to the same business day, is not less than the interval between the shifts, which interval between the shifts has been inputted into the scheduling device in advance. Note that in the case of management of the shifts of the part-timers, the user only needs to input a small value (0.5 minute, for example) as the interval between the shifts so that the time ranges of the data groups would not overlap each other.

In Step 5, for each of the business days, the scheduling device adds a time range which is not included in any shift time ranges to a neighboring shift time range of a data group so that the shift time range of the data group is extended. Because of this, there would be no time ranges to which no part-timers are not assigned.

A flow of the processes described above can be carried out by a grouping section (first grouping section, second grouping section) included in the scheduling device.

In Step 6, the scheduling device generates output data in which each of the pieces of personnel data, the information on the data group to which a corresponding part-timer belongs, and the information on the business day(s) on which the corresponding part-timer works are associated with each other. This process can be carried out by an output data generation section included in the scheduling device. FIG. 16 is a view illustrating a part (from the first business day to the fourth business day) of a resultant shift schedule on which 100 part timers are assigned to 7 business days. For example, on the first business day (a group of "business day: 1" in FIG. 16), part-timers corresponding to pieces of personnel data, which pieces are grouped into groups 1, 7, and 13, would work. In FIG. 16, the start time (working start time) and the end time (working end time) of the extended shift time range are shown as PST and PET, respectively. Note that, for the sake of management, it is possible to round out values below the decimal point so as to manage the shift time ranges per hour. Accordingly, on the first business day, the part-timers corresponding to the pieces of personnel data, belonging to the group 1, work from 0:00 to 9:00, and the part-timers corresponding to the pieces of personnel data, belonging to the group 7, work from 9:00 to 17:00. Meanwhile, on the third business day (a group of "business day: 3" in FIG. 16), the part-timers corresponding to the pieces of personnel data, which pieces are grouped into groups 3 and 10, would work.

Note that in a case where the scheduling manager inputs a plurality of values as the number of workers on duty, the scheduling device outputs a plurality of patterns of the shift schedule. Accordingly, the scheduling manager can appropriately select a preferable pattern from the plurality of patterns of the shift schedule.

As described above, according to the present embodiment, it is possible to create a shift schedule with respect to a plurality of part-timers whose desired shifts (start time, end time) are different from each other.

Note that in the present embodiment, as an example other than the scheduling for mass spectrometry analysis, shifts of a plurality of part-timers are managed. However, the present invention is not limited to this, and is applicable to assignment of used hours of each of conference rooms or assembly halls to applicants, home delivery scheduling carried out by a home delivery company, and the like. In the case of the assignment of the used hours of each of the conference rooms or the assembly halls to applicants, for example, it is possible to carry out, for a plurality of applicants whose desired used hours are different from each other, the scheduling as to which conference room is assigned to an applicant on which business day, by determining the number of assembly halls available and an interval between the used hours of the respective applicants. The interval may be a period of time necessary for setting up the assembly hall or cleaning the assembly hall. Further, in the case of the home delivery scheduling, for example, it is possible to carry out, for a plurality of packages whose desired delivery times are different from each other, the scheduling of the number of employees necessary for the delivery and a delivery schedule of each of the employees, by determining the number of packages that one employee can collect and deliver, a period of time necessary for the employee to move from a target place to the next target place, and the like.

The present invention is not limited to the description of the embodiments above, but may be altered by a skilled person within the scope of the claims. An embodiment based on a proper combination of technical means disclosed in different embodiments is encompassed in the technical scope of the present invention.

In the scheduling device of the present invention, the first grouping section may group the plural pieces of substance data into the plurality of first data groups on the basis of the order resulting from the sorting so that the number of the plural pieces of substance data, included in each of the plurality of first data groups, is not more than a second specified value set in advance to be not more than the number of channels of the mass spectrometer.

In the scheduling device of the present invention, each of the plural pieces of substance data further may include a shortest detection period of time that indicates a period of time necessary for detecting a substance corresponding to that piece of substance data, and the first grouping section may group the plural pieces of substance data into the plurality of first data groups on the basis of the order resulting from the sorting so that a sum of shortest detection periods of time of pieces of substance data included in each of the plurality of first data groups is not more than a second specified value set in advance.

In the scheduling device of the present invention, the first grouping section preferably determines, for each of the plural pieces of substance data, a detection time range between a detection start time included in that piece of substance data to a detection end time included in that piece of substance data, and in a case where two pieces of substance data among the plural pieces of substance data, which two pieces of substance data are successively arrayed in the order resulting from the sorting, have detection time ranges that do not overlap each other, the first grouping section preferably groups the two pieces of substance data into different first data groups.

In the scheduling device of the present invention, in a case where, in each of the second data group(s), there is a time range which is not included in any measurement time ranges of the first data group(s) of that second data group, the second grouping section preferably adds the time range to a measurement time range of a neighboring first data group so as to extend the measurement time range of the neighboring first data group.

In the scheduling device of the present invention, the scheduling device preferably receives, as the first specified value, a plurality of first specified values different from each other, the second grouping section preferably groups the plurality of first data groups into the second data group(s) on the basis of the plurality of first specified values, respectively, and the output data generation section preferably generates measurement schedules with respect to the plurality of first specified values, respectively.

In the same manner, in the scheduling device of the present invention, the scheduling device preferably receives, as the second specified value, a plurality of second specified values different from each other, the first grouping section preferably groups the plural pieces of substance data into the plurality of first data groups on the basis of the plurality of second specified values, respectively, the second grouping section preferably provides a plurality of results corresponding to the plurality of second specified values, respectively, and the output data generation section preferably generates measurement schedules with respect to the plurality of second specified values, respectively.

In the scheduling device of the present invention, the measurement time range may be a function time range in which the mass spectrometer carries out measurement with respect to one or more designated target substances.

The scheduling device of the present invention, preferably further includes a first data reception section for receiving the first specified value as input data.

In the same manner, the scheduling device of the present invention, preferably further includes a second data reception section for receiving the second specified value as input data.

The mass spectrometry system of the present invention, preferably further includes a selection reception section for receiving an instruction on which a measurement schedule is used for the mass spectrometry analysis among one or more measurement schedules generated by the scheduling device, the mass spectrometer carrying out the mass spectrometry analysis by use of the measurement schedule determined by the instruction thus received.

INDUSTRIAL APPLICABILITY

The present invention can carry out scheduling of processing periods of time corresponding to a plurality of targets, respectively. For example, the present invention is applicable to creation of an analysis schedule in a mass spectrometer, shift management of part-timers, management of used hours of each of assembly halls, and the like.

REFERENCED SIGNS LIST

1: Mass spectrometry system
11: Function generation section (first grouping section)
12: Measurement group generation section (second grouping section)
13: Function range extension section (second grouping section)
14: Output data generation section
15: Condition reception section (first data reception section, second data reception section)
16: Substance data storage section
17: Condition storage section
18: Selection reception section
19: User input means
100: Scheduling device
200: Liquid chromatograph (substance separation device)
300: Mass spectrometer

The invention claimed is:

1. A scheduling device comprising:

a first grouping section for (i) sorting out plural pieces of substance data in a mass spectrometer, the plural pieces of substance data corresponding to a plurality of substances respectively, each of the plural pieces of substance data indicating a plurality of features of its corresponding substance, the first grouping section sorting out the plural pieces of substance data on the basis of at least one of a retention time, a detection start time, and a detection end time that are included in each of the plural pieces of substance data, and (ii) grouping the plural pieces of substance data into a plurality of first data groups so that (1) an upper limit of the number of pieces of substance data per first data group is equal to the number of channels of the mass spectrometer, and (2) each of the plurality of first data groups includes pieces of substance data that are successively arrayed in an order resulting from the sorting;

a second grouping section for (i) finding, for each of the plurality of first data groups, a measurement time range which is a time range between an earliest detection start time among those of pieces of substance data, included in that first data group, and a latest detection end time among those of the pieces of substance data, included in that first data group, and (ii) grouping the plurality of first data groups into a second data group(s) so that an interval between time ranges of neighboring first data groups among the plurality of first data groups is not less than a first specified value set in advance; and an output data generation section for generating a measurement schedule for (i) introducing a target sample of measurement into a substance separation device on the basis of the second data group(s), and (ii) controlling the channels of the mass spectrometer so that substances corresponding to the plural pieces of substance data, included in each of the plurality of first data groups, are subjected to mass spectrometry analysis.

2. The scheduling device as set forth in claim 1, wherein:

in a case where, in each of the second data group(s), there is a time range which is not included in any measurement time ranges of the first data group(s) of that second data group, the second grouping section adds the time range to a measurement time range of a neighboring first data group so as to extend the measurement time range of the neighboring first data group.

3. The scheduling device as set forth in claim 2, wherein:

the first grouping section groups the plural pieces of substance data into the plurality of first data groups on the basis of the order resulting from the sorting so that the number of the plural pieces of substance data, included in each of the plurality of first data groups, is not more than a second specified value set in advance to be not more than the number of channels of the mass spectrometer.

4. The scheduling device as set forth in claim 2, wherein:

each of the plural pieces of substance data further includes a shortest detection period of time that indicates a period of time necessary for detecting a substance corresponding to that piece of substance data; and the first grouping section groups the plural pieces of substance data into the plurality of first data groups on the basis of the order resulting from the sorting so that a sum of shortest detection periods of time of pieces of substance data included in each of the plurality of first data groups is not more than a second specified value set in advance.

5. The scheduling device as set forth in claim 2, wherein:

the first grouping section determines, for each of the plural pieces of substance data, a detection time range between a detection start time included in that piece of substance data to a detection end time included in that piece of substance data; and in a case where two pieces of substance data among the plural pieces of substance data, which two pieces of substance data are successively arrayed in the order resulting from the sorting, have detection time ranges that do not overlap each other, the first grouping section groups the two pieces of substance data into different first data groups.

6. The scheduling device as set forth in claim 2, wherein:

the scheduling device receives, as said first specified value, a plurality of first specified values different from each other;

the second grouping section groups the plurality of first data groups into the second data groups) on the basis of the plurality of first specified values, respectively; and the output data generation section generates measurement schedules with respect to the plurality of first specified values, respectively.

7. The scheduling device as set forth in claim 3, wherein:

the scheduling device receives, as said second specified value, a plurality of second specified values different from each other;

the first grouping section groups the plural pieces of substance data into the plurality of first data groups on the basis of the plurality of second specified values, respectively;

the second grouping section provides a plurality of results corresponding to the plurality of second specified values, respectively; and the output data generation section generates measurement schedules with respect to the plurality of second specified values, respectively.

8. The scheduling device as set forth in claim 4, wherein:

the scheduling device receives, as said second specified value, a plurality of second specified values different from each other;

the first grouping section groups the plural pieces of substance data into the plurality of first data groups on the basis of the plurality of second specified values;

the second grouping section provides a plurality of results corresponding to the plurality of second specified values, respectively; and the output data generation section generates measurement schedules with respect to the plurality of second specified values, respectively.

9. The scheduling device as set forth in claim 2, wherein:

the measurement time range is a function time range in which the mass spectrometer carries out measurement with respect to one or more designated target substances.

10. The scheduling device as set forth in claim 2, further comprising a first data reception section for receiving the first specified value as input data.

11. The scheduling device as set forth in claim 3, further comprising a second data reception section for receiving the second specified value as input data.

12. The scheduling device as set forth in claim 4, further comprising a second data reception section for receiving the second specified value as input data.

13. A mass spectrometry system comprising:

a scheduling device as set forth in claim 2;

a substance separation device; and a mass spectrometer, the scheduling device supplying the substance separation device and the mass spectrometer with the measurement schedule as output data, the substance separation device receiving a measurement sample per second data group, the mass spectrometer carrying out mass spectrometry analysis by controlling the channels in accordance with each of the plurality of first data groups.

14. The mass spectrometry system as set forth in claim 13, further comprising:

a selection reception section for receiving an instruction on which a measurement schedule is used for the mass spectrometry analysis among one or more measurement schedules generated by the scheduling device, the mass spectrometer carrying out the mass spectrometry analysis by use of the measurement schedule determined by the instruction thus received.

* * * * *